Dec. 14, 1965  J. T. BULL ETAL  3,222,988

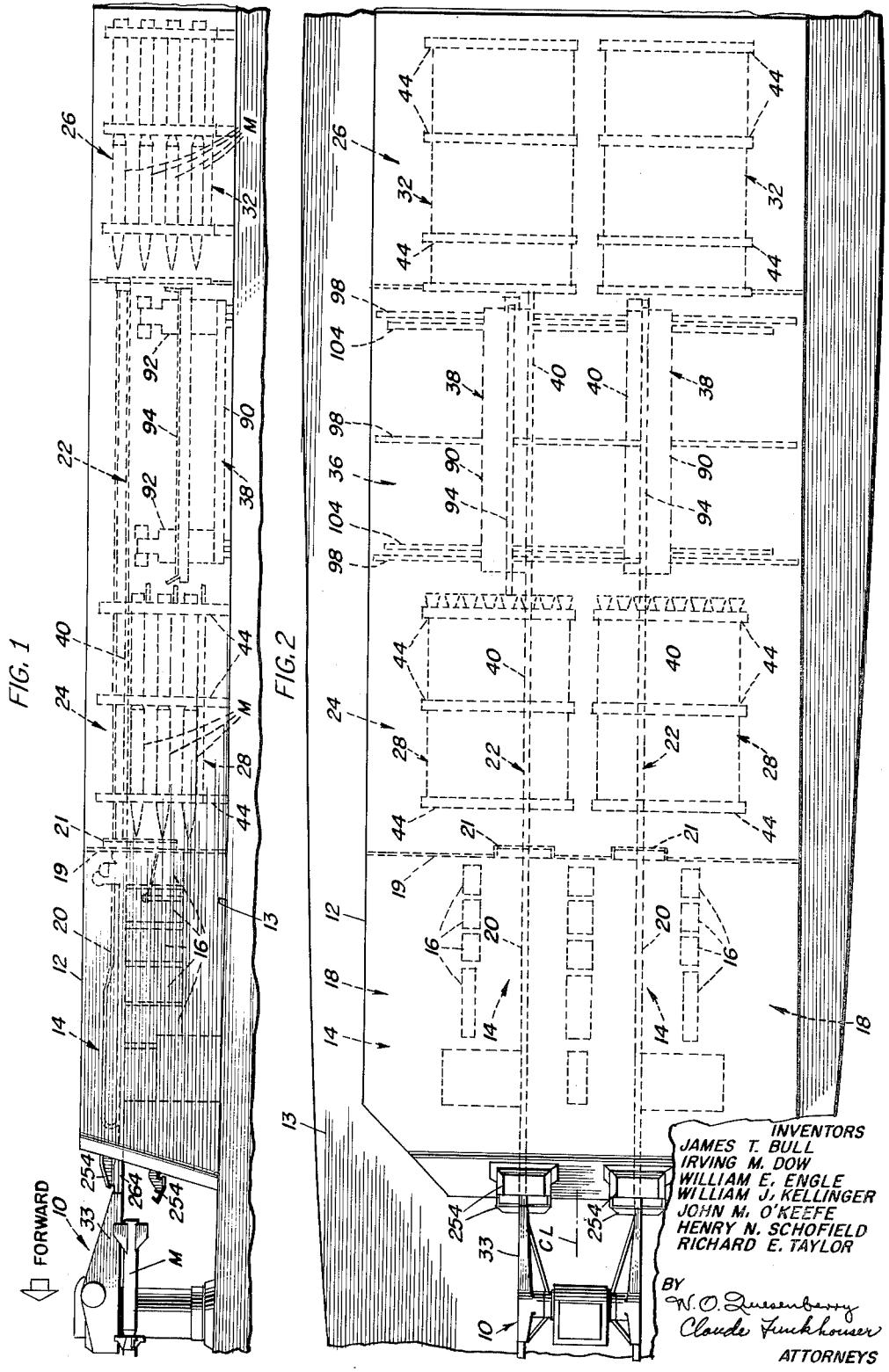

MISSILE LAUNCHING SYSTEM

Filed April 26, 1961  20 Sheets-Sheet 2

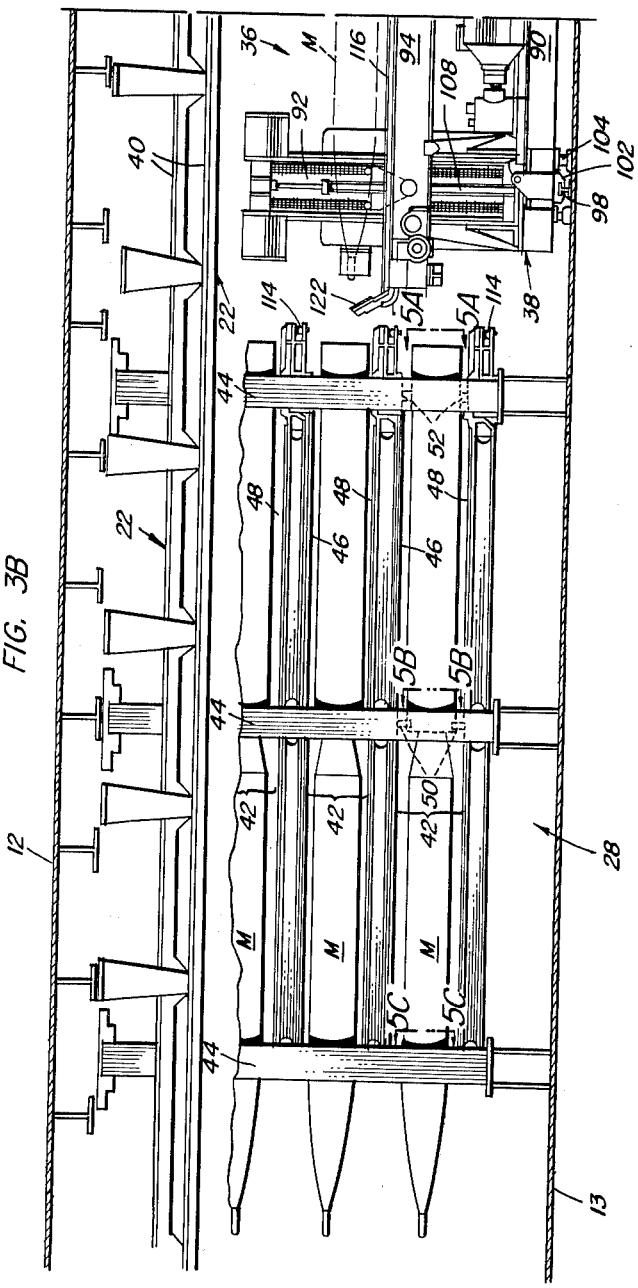

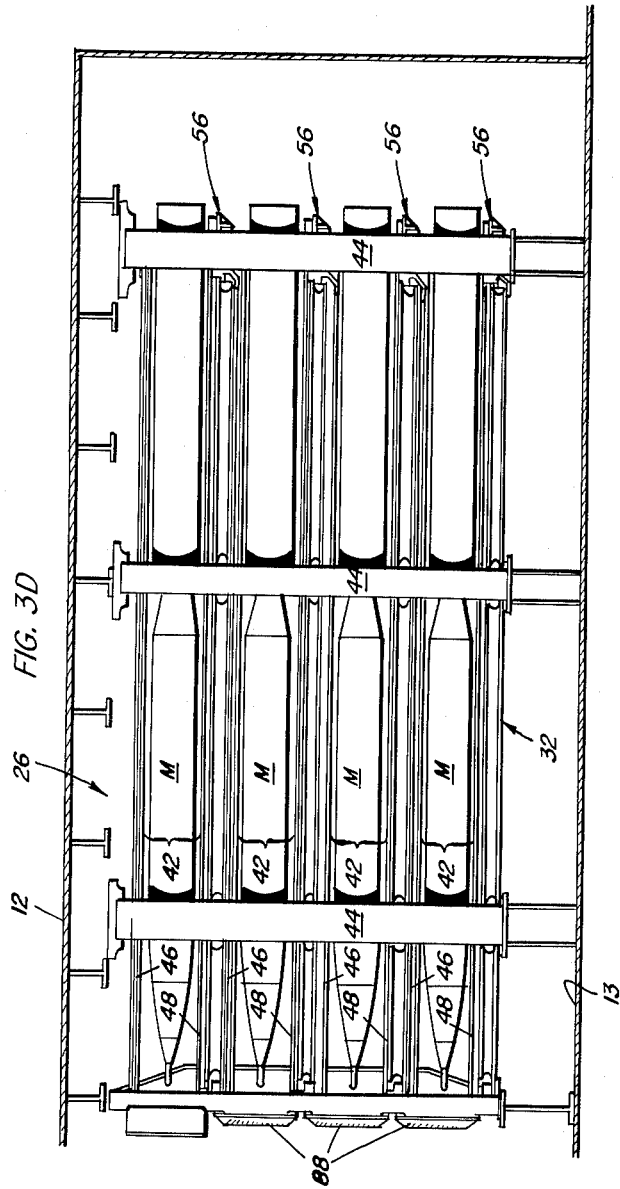

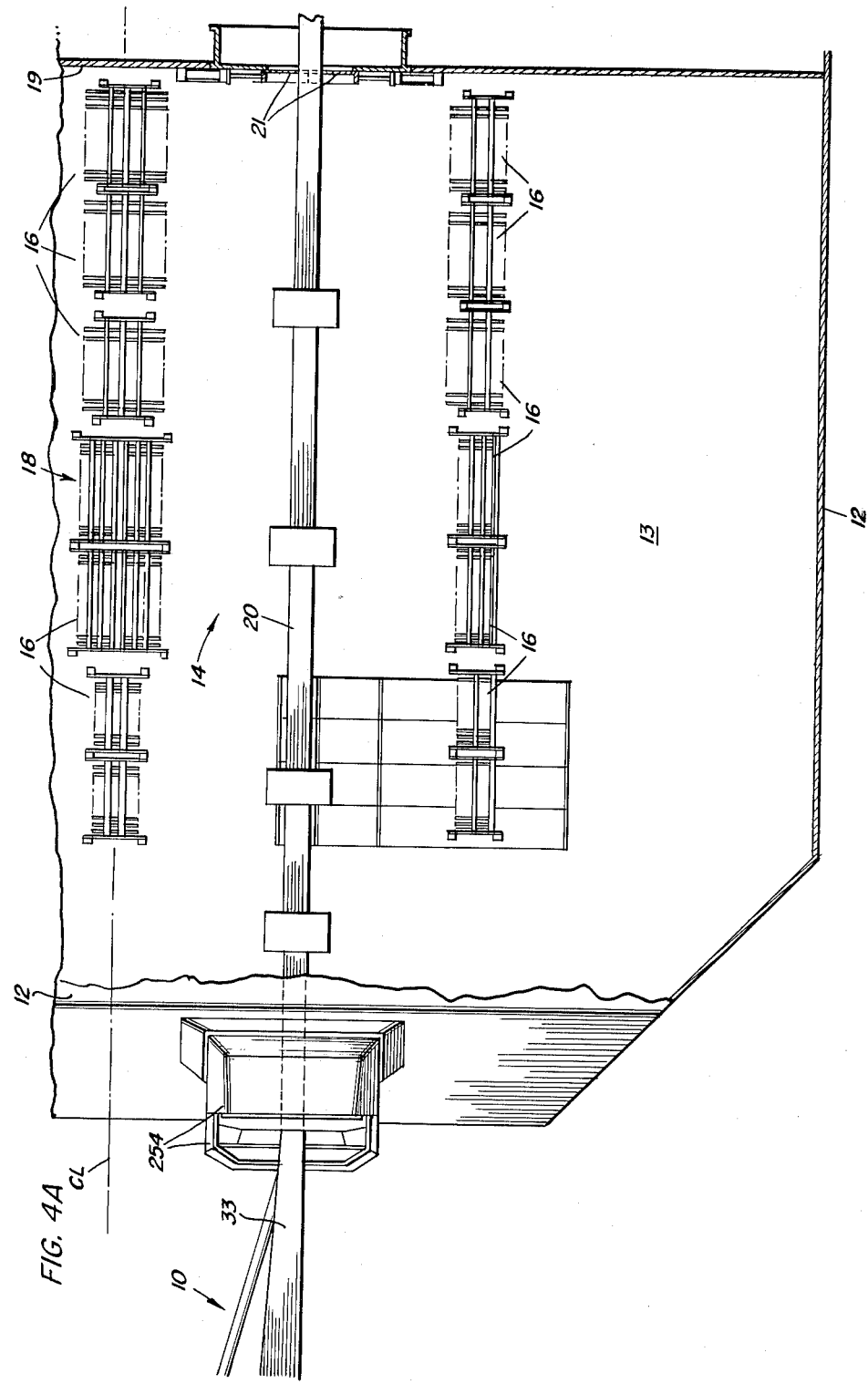

Dec. 14, 1965  J. T. BULL ETAL  3,222,988
MISSILE LAUNCHING SYSTEM
Filed April 26, 1961  20 Sheets-Sheet 7

Dec. 14, 1965         J. T. BULL ETAL         3,222,988
                    MISSILE LAUNCHING SYSTEM
Filed April 26, 1961                      20 Sheets-Sheet 12

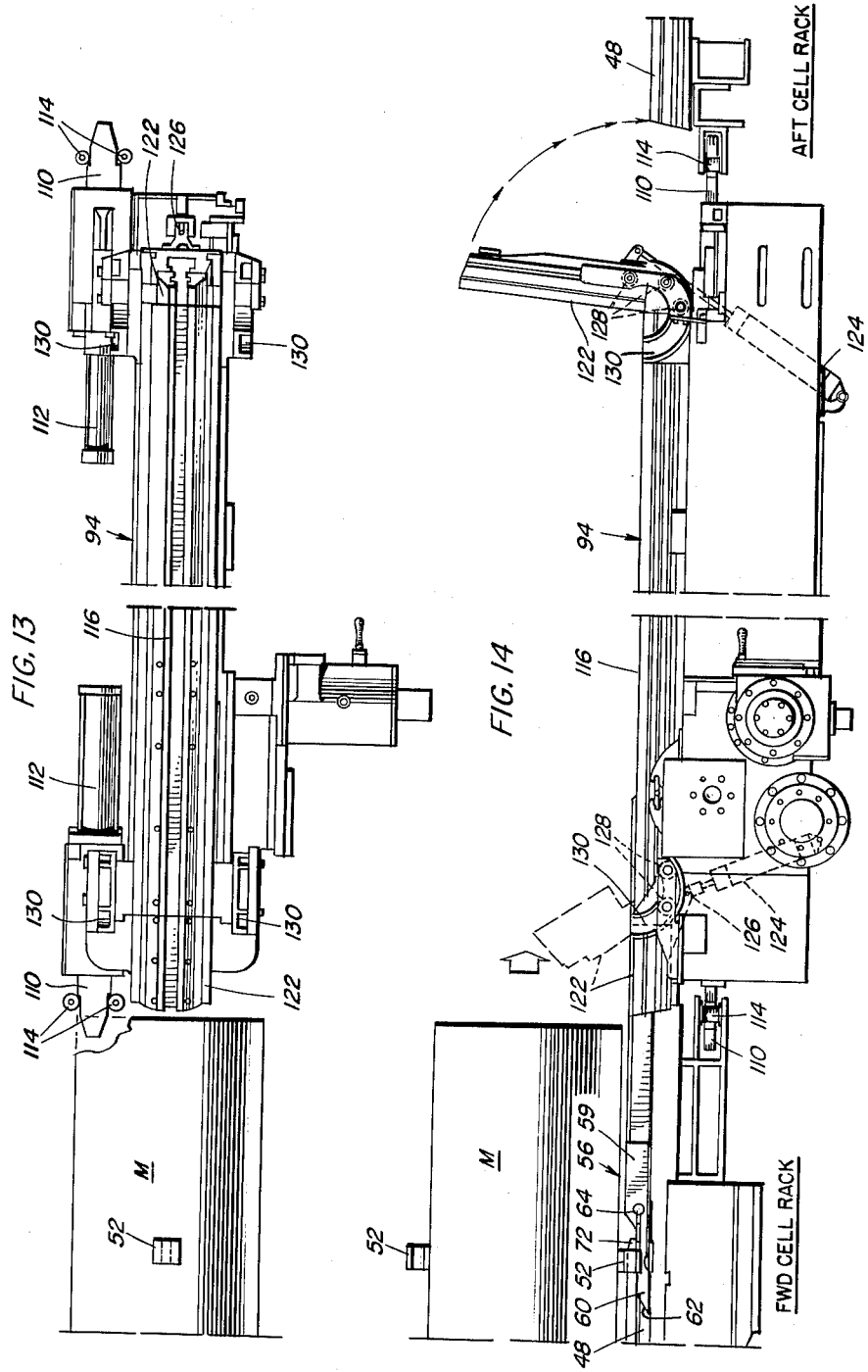

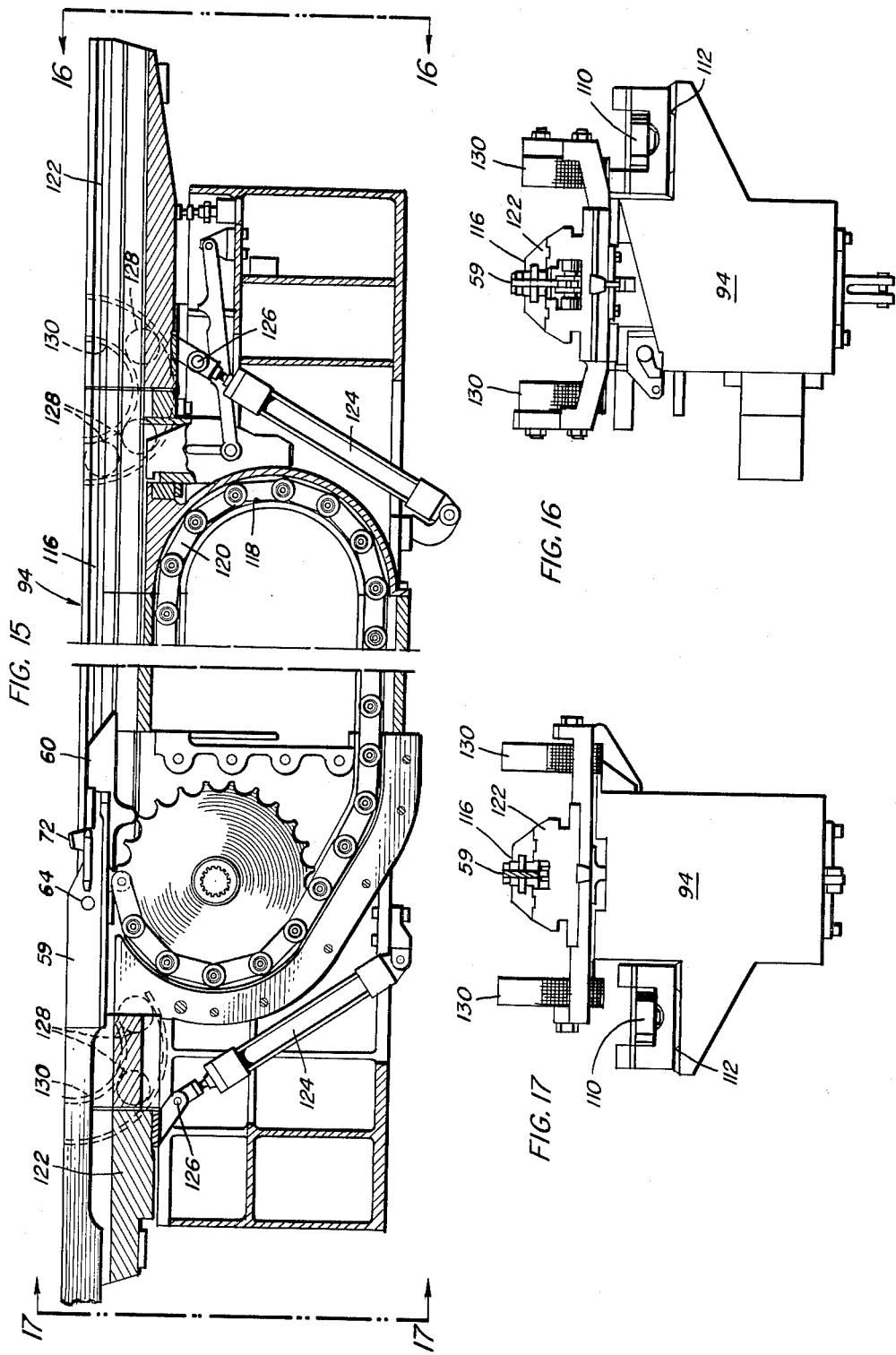

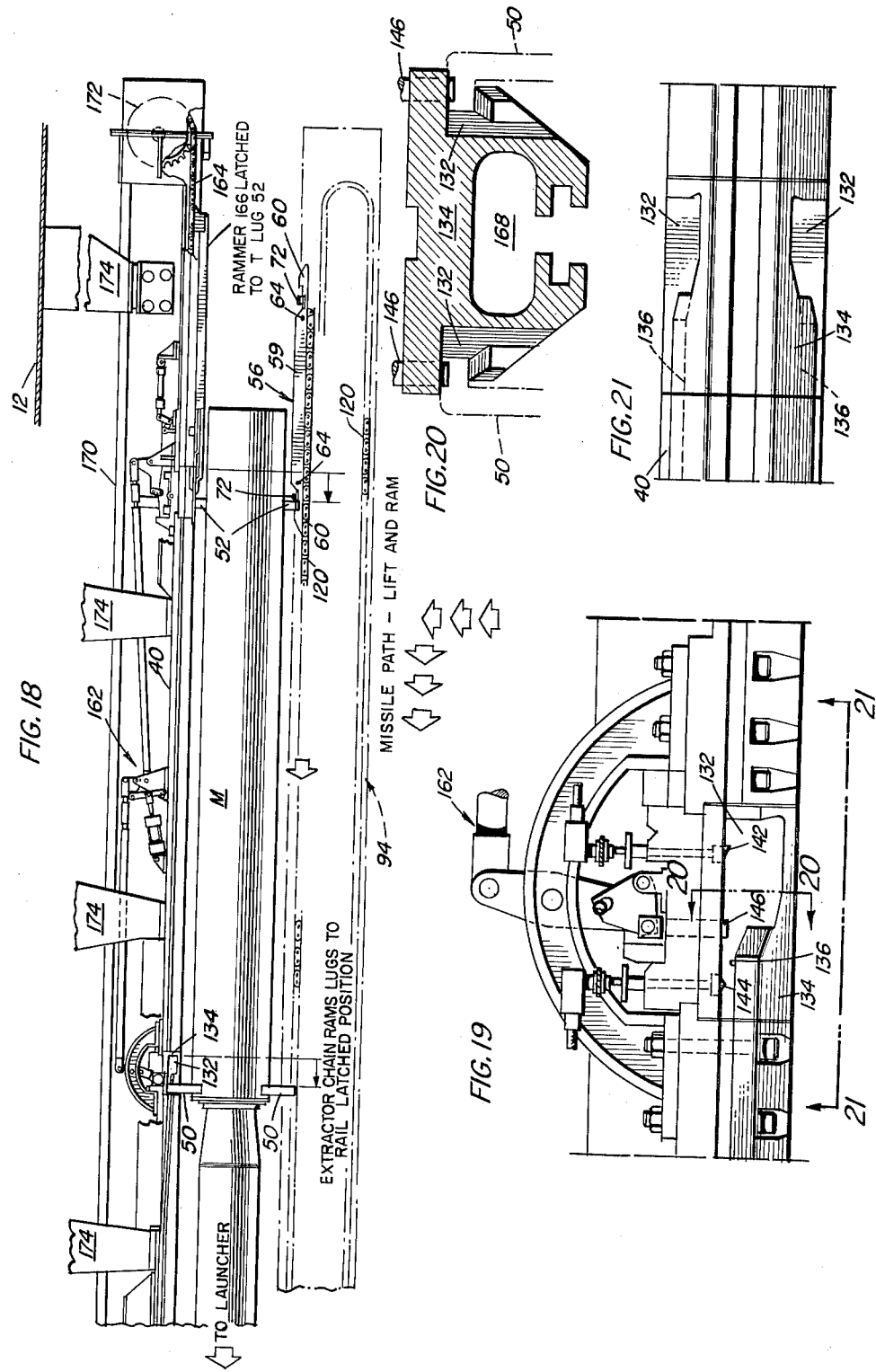

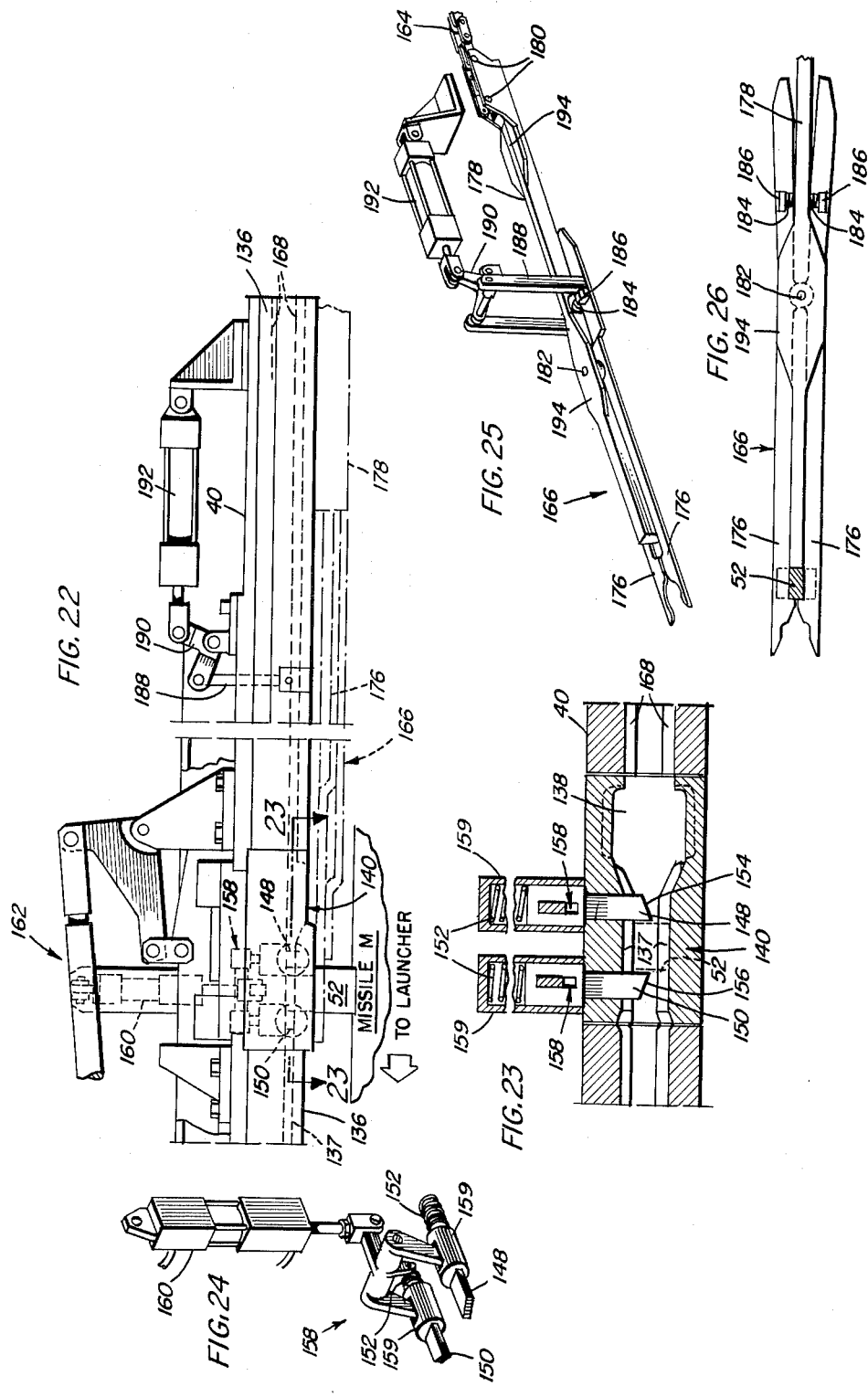

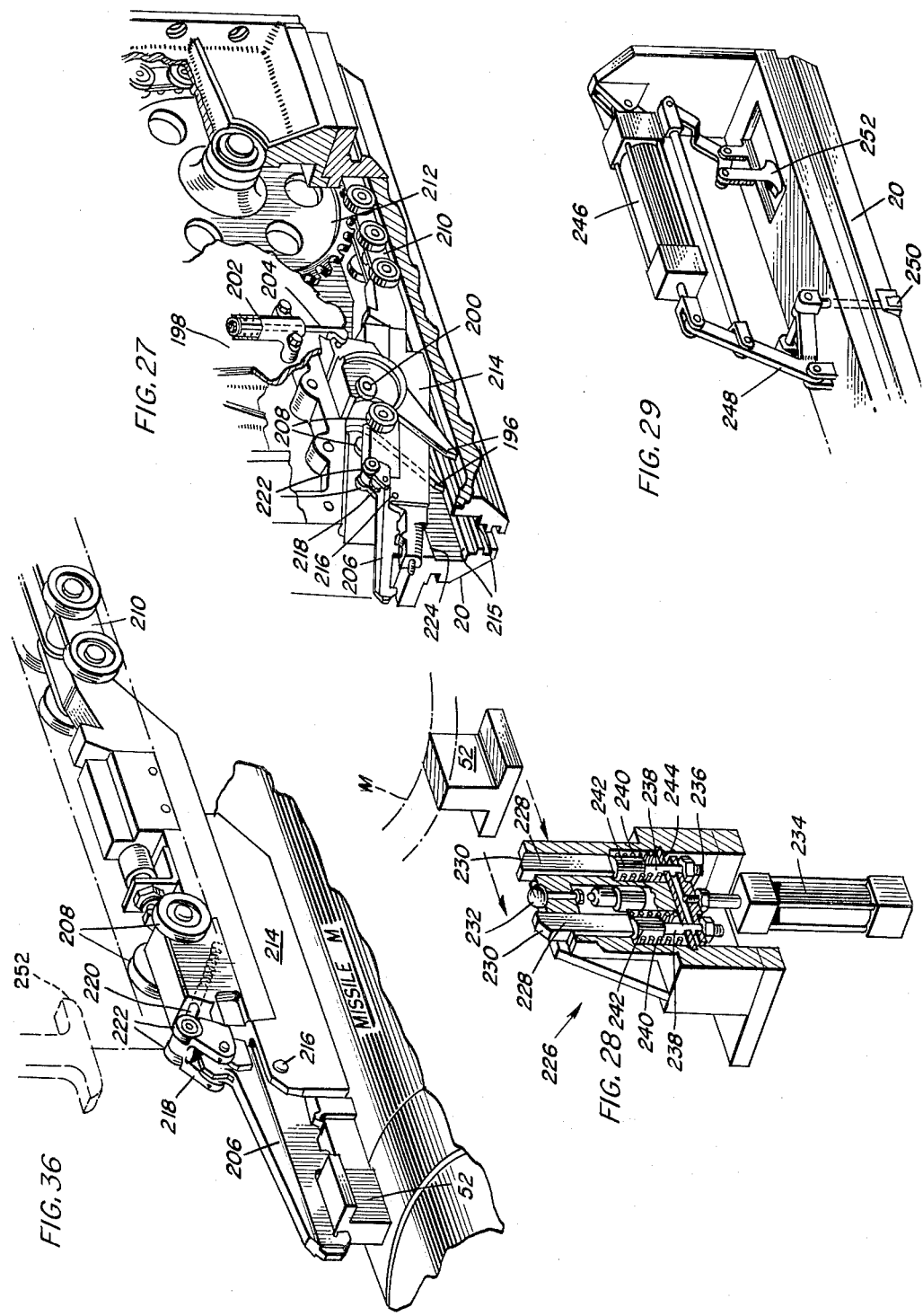

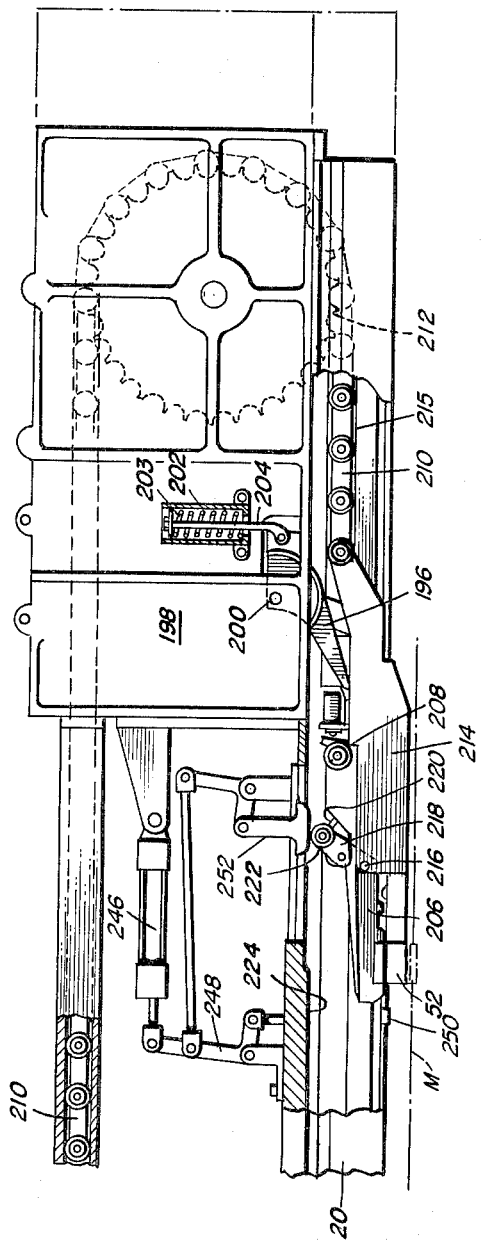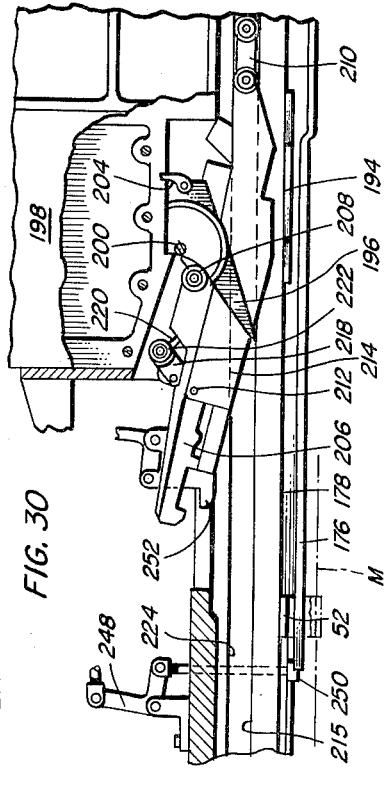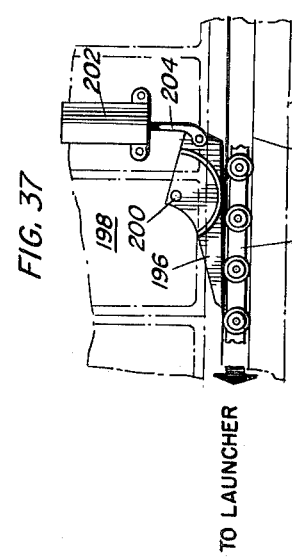

Dec. 14, 1965          J. T. BULL ETAL          3,222,988
MISSILE LAUNCHING SYSTEM
Filed April 26, 1961                    20 Sheets-Sheet 20
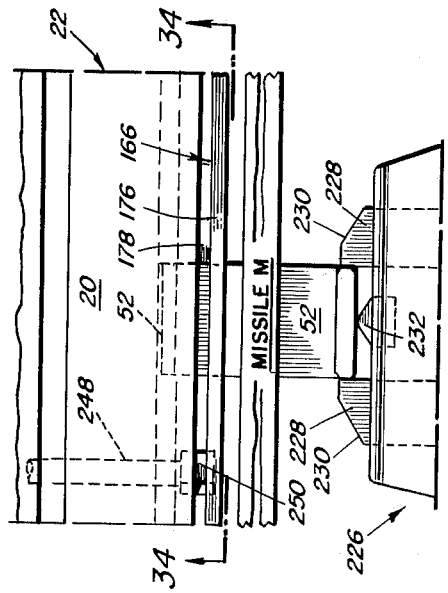
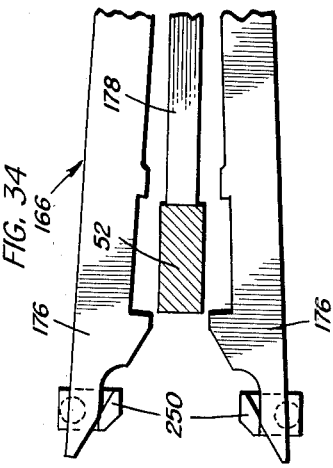
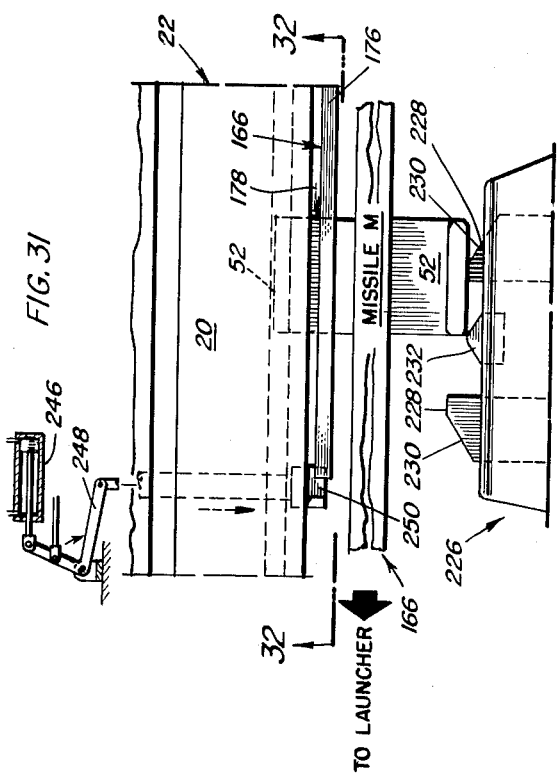
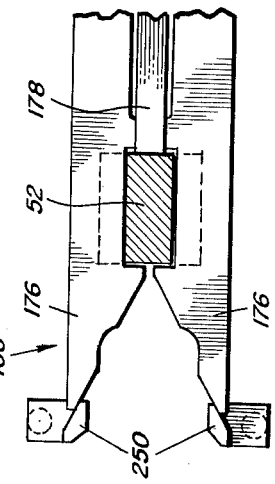

United States Patent Office 3,222,988
Patented Dec. 14, 1965

3,222,988
MISSILE LAUNCHING SYSTEM
James T. Bull, Huntsville, Ala., Irving M. Dow, Bethesda, and William E. Engle, Hyattsville, Md., William J. Kellinger, Washington, D.C., and John M. O'Keefe, Hillcrest Heights, Henry N. Schofield, Kensington, and Richard E. Taylor, Hyattsville, Md., assignors to the United States of America as represented by the Secretary of the Navy
Filed Apr. 26, 1961, Ser. No. 106,411
18 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

This invention relates to a missile launching system for intermediate range guided missiles of the type employing a longitudinally disposed axially aligned booster. More particularly the invention relates to a launching system incorporating stowage facilities for a substantial number of missiles in a ready service condition with the booster and third portions thereof initially attached to provide a unitary assembly therebetween.

The instant invention is an above deck system readily adaptable for use as a shipboard conversion type launching system which requires a minimum amount of modification of the below deck structures of the ship other than to provide sufficient structural support and stability balance therefor. The present launching system employs a dual arm launcher generally similar to that disclosed in U.S. Patent 2,826,960 to Ferdinand J. Schiavi.

The instant system further includes an above deck enclosure or missile house in which a plurality of missile magazines are disposed and are served by a pair of transfer cars, one for each launching arm of the dual arm launcher. This enclosure further includes a pair of monorail ramming mechanisms for moving missiles from the transfer cars forwardly to a wing and fin assembly area and subsequently across pivotally mounted spanner rails onto the launcher arms.

Certain prior types of launching systems have incorporated elevator assemblies to lift a missile, disposed in a horizontal position immediately below the launcher arms, vertically upward to an engaging position with the launcher arms while other systems have incorporated a ready service ring type assembly with a plurality of missiles disposed thereon and arranged in a vertical manner for vertical hoisting onto the launcher arms or launcher rails with the launcher elevated to a 90 degree position.

Still other prior art shipboard launching systems, both of the types designed specifically for use in new ship construction and those particularly well adapted for installation during gun-to-missile conversions of available ships, have incorporated revolving or indexing types of ready service mechanisms with mono-rail ramming systems.

In the instant invention, the missiles are stowed in ready service condition in fixed cells and only the individual missile to be launched is moved during the selection and handling portions of the launching cycle. The cell-type arrangement used in the instant system is such as to readily provide for each launching arm a first magazine containing a pluarlity of cells and, longitudinally spaced therefrom, a second magazine, also containing a plurality of cells. Selection of the missile to be launched is accomplished by a selection mechanism or transfer means disposed in the space intermediate the first and second magazines. This arrangement minimizes the size, weight, and number of moving parts because there is no necessity for moving all of the missiles for the selection of a desired missile from its respective stowage assemblage, as is required in many types of prior art missile launching systems.

Thus it is an object of the instant invention to provide a missile launching system wherein a large number of missiles can be stowed in assembled condition and can be rapidly handled during launching operations and which requires a minimum of moving parts for selecting and conveying missiles to the launcher.

Another object of the instant invention resides in the provision of an above-deck missile launching system containing mechanisms for selecting a missile from a stowage device and subsequently transferring the selected missile to a launcher.

It is a further object of the invention to provide a missile launching system wherein the entire system may be mounted on the main deck of a ship.

Another object of the invention resides in the provision of an improved missile transfer mechanism for selecting missiles from stowage cells of two longitudinally spaced missile magazines and which is disposed in the space intermediate the two magazines whereby selection may be made from either magazine.

A further object of this invention is to provide a missile transfer mechanism for transferring, by linear motion only, a missile from a stowage cell to a ramming mechanism, the missile being continually oriented in the same attitude during all phases of the transfer operation.

Yet another object of the present invention is to provide a missie transfer car, which is capable of transferring missiles from any of a plurality of magazines to either launching rail of a dual-arm launcher.

It is a further object of the invention to have a plurality of transfer cars, each being normally individual to a stowage or ready service system for one of a pair of launching arms of a dual arm launcher system wherein the track on which the transfer cars move are in mutual alignment and interchange of transfer car functions may be accomplished by either in the event of breakdown of the other.

Other objects and many of the attendant advantage of this invention will be readily appreciated as the same becomes better understood by reference to the following detailed description when considered in connection with the accompanying drawings wherein:

FIG. 1 is a side elevation of the missile launching system of the invention with portions thereof shown in phantom;

FIG. 2 is a top plan view of the system of FIG. 1 with portions thereof shown in phantom and illustrating both halves of the system;

FIG. 3D is a side elevation of the aft magazine area which is immedaitely aft of the missile transfer car and illustrates missiles in the cell racks, cell doors, and missile guiding and securing rails;

FIGS. 4A, 4B, 4C and 4D are top plan views of the portion of the system illustrated in FIGS. 3A, 3B, 3C and 3D, respectively;

FIG. 13 is a top plan view of the extractor beam, spanning rails, and aligning latches of the transfer car;

FIG. 14 is an elevation view of the structure shown in FIG. 13;

FIG. 15 is a vertical, longitudinal section view of the extractor beam;

FIG. 16 is an end elevation view of the extractor beam as seen from line 16—16 in FIG. 15;

FIG. 17 is an end elevation view of the extractor beam as seen from line 17—17 in FIG. 15;

Figure 3A:
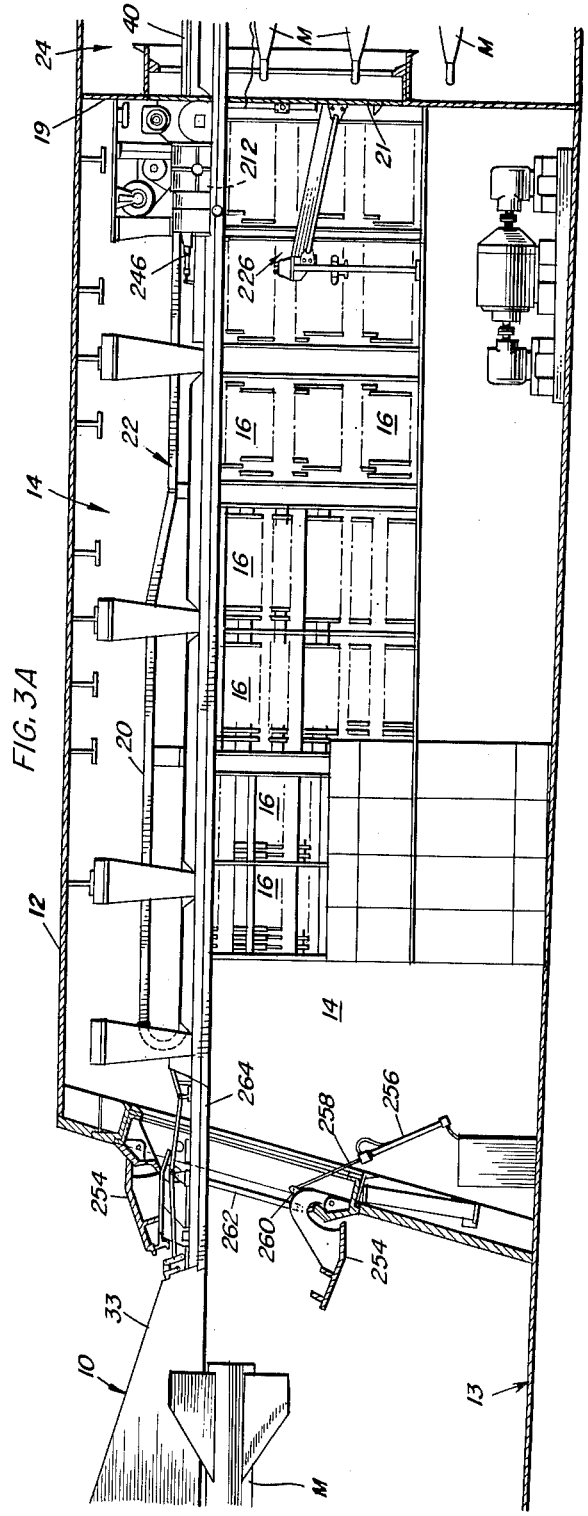
FIG. 3A is a side elevation of the launcher end of the system and illustrates, among other elements, the second stage rammer, the forward end of the first stage rammer, finning area, blast door and spanner rail.
Figure 3B:
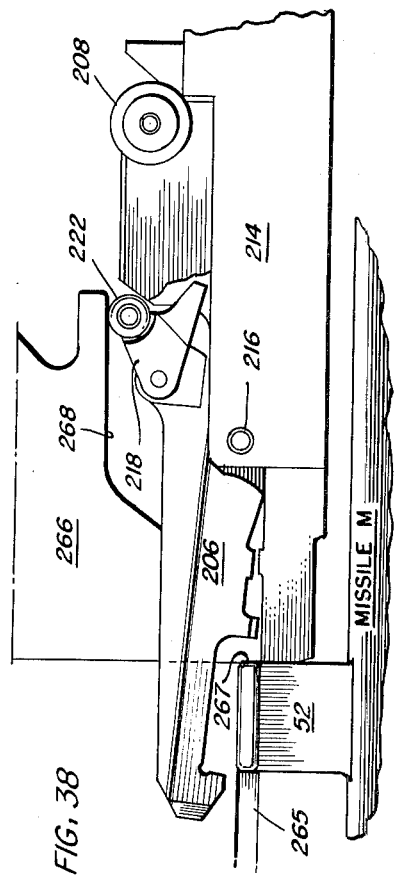
FIG. 3B is a side elevation of the forward magazine area which is immediately aft of the finning area and illustrates among other elements, an intermediate portion of the first stage rammer, missiles in the cell racks, and the forward end portion of the transfer car.

FIG. 18 a side elevation view of the aft end of the first stage rammer, portions of the extractor chain and extractor head and illustrates the manner in which a missile is transferred from the extractor beam to the first stage rammer;

FIG. 19 is a side elevation view of the U-lug floating rail on the first stage rammer;

FIG. 20 is a vertical, transverse section view taken along a line substantially corresponding to line 20—20 of FIG. 19;

FIG. 21 is a bottom plan view of the U-lug floating rail as viewed from line 21—21 of FIG. 19;

FIG. 22 is a side elevation view of the portion of the first stage rammer adjacent to and including the T-lug floating rail;

FIG. 23 is a transverse, longitudinal section view of the T-lug floating rail and missile latches as viewed from section line 23—23 of FIG. 22;

FIG. 24 is a perspective view of the missile latches of FIG. 23 and the actuating mechanism associated therewith;

FIG. 25 is a perspective view of the first stage rammer head and the mechanism employed for opening the hook members thereof;

FIG. 26 is a top plan view of the first stage rammer head;

FIG. 27 is a cut-away perspective view of the second stage rammer head, swinging track and a portion of the second chain and drive sprocket therefor, all being illustrated in their respective positions prior to the arrival of the first stage rammer head;

FIG. 28 is a cut-away perspective view of the missile latches which capture the bottom missile T-lug as the missile is moved from the first stage rammer into the second stage rammer;

FIG. 29 is a perspective view of the mechanism for effecting disconnection of the first stage rammer head from the top missile T-lug upon arrival of the missile in the aft end portion of the second stage rammer;

FIG. 30 is a side elevation view, partly broken away and partly in section, illustrating the position of the second stage rammer head and swing track when the first stage rammer head positions a missile on the second stage rammer;

FIG. 31 is a side elevation of the forward end portion of the first stage rammer head and the bottom T-lug latches for the second stage rammer and illustrates the relationship of parts during the initial phase of disconnecting the first stage rammer head and latching the bottom T-lug of the missile in a position whereby the missile subsequently can be moved forward by the second stage rammer;

FIG. 32 is a bottom plan view of the forward end portion of the first stage rammer head as viewed from line 32—32 of FIG. 31;

FIG. 33 is a changed-position view similar to FIG. 31 but showing the relationship of parts after the first stage rammer head has been disconnected from the top T-lug and the bottom T-lug has been captured by the missile latches for the second stage rammer;

FIG. 34 is a bottom plan view of the forward end portion of the first stage rammer head as viewed from line 34—34 of FIG. 33;

FIG. 35 is a side elevation, partly broken away and partly in section, illustrating the aft end of the second stage rammer and the second stage rammer head connected to the top T-lug of the missile after the first stage rammer head has been disconnected and retracted;

FIG. 36 is a perspective view of the second stage rammer head connected to the top missile T-lug;

FIG. 37 is a side elevation view, partly broken away and partly in phantom illustrating the position of the swinging track when the second stage rammer head moves toward the launcher; and FIG. 38 is a side elevation of the launcher positioning spade for disconnecting the second stage rammer head from the top missile T-lug when the missile has arrived at its final position on the missile launcher rails.

Referring now to the drawings wherein like numerals designate like or corresponding parts, and more particularly to FIGS. 1 through 4D, it will be observed that the system of the present invention is divided into several major areas or compartments to which are allocated the different portions of the system. The forwardmost subassembly of the missile launching system, is the dual arm missile launcher generally designated by numeral 10 and which may be of the general type disclosed in the copending application of Garold A. Kane et al., Serial No. 506,-392, filed May 5, 1955 or that disclosed in U.S. Patent No. 2,826,960, afore-mentioned.

Immediately aft of missile launcher 10 is a missile house 12 which contains all portions of the missile launching system, excluding launcher 10, and which is carried by a substantially planar member 13, such as the main deck of a ship, for example. The first area or compartment immediately aft of the missile launcher is the finning area 14 which contains the fin and wing storage racks 16, the two checkout areas 18 (FIG. 2) where the missiles are checked before being stowed, and the second stage 20 of the ramming mechanisms, generally designated by numeral 22.

Aft of finning area 14 of missile house 12, and separated from the finning area by a fire and explosion resistant bulkhead 19 having blast doors 21 through which ramming mechanisms 22 pass, are two magazine areas 24 and 26 each of which contains two magazine cell racks 28 and 32, respectively. In each magazine area a cell rack is located on each side of the center line of the missile house so that each of the guide arms 33 of the dual arm missile launcher will be serviced by a cell rack individual thereto. The two magazine areas are spaced apart to provide a strike-down and transfer area 36 therebetween containing two transfer cars generally designated by numeral 38. One transfer car services the cell racks on one side of the missile house longitudinal center line and the other transfer car services those on the other side of the center line. Also, the aft portion of each of the first rammer stages 40 is contained within transfer area 36.

For purposes of clarity, only one half of the system will be described in detail, it being understood that the other half is a mirror image of the half to be described. The cell racks 28 and 32 comprise individual cells 42 constructed from three spaced weldment frames 44 connected by upper and lower rails 46 and 48, respectively, both adapted to receive the U-lugs and T-lugs 50 and 52, respectively, attached to the missile booster and the support bands 54 attached to the bird portion of the missile. The rails suport the missile at the location of the support bands, U-lugs and T-lugs both from the bottom and from the top.

Referring now to FIGS. 8A through 9D, a missile stop and latch mechanism, generally designated by numeral 56, is mounted in each cell to latch the lower booster T-lug 52 to prevent fore and aft movement of the missile in the cell. This latch mechanism includes two pivoted lock tongs 58 which are resiliently urged to a closed position and are adapted to be spread by T-lug 52 as the missile is placed in the cell by the extractor head 59 having an extractor hook 60 pivotally connected thereto. The tongs 58 close over the T-lug when the latter engages a stop member 61.

The free end of extractor hook 60 is terminated by an inclined surface 62 which the bottom of T-lug 52 engages as the free end of the hook approaches the latter during the removal of a missile from a cell. This engagement of surface 62 with the bottom of T-lug 52 causes hook 60 to be cammed in a counterclockwise direction, as viewed in FIGS. 8A and 8B, about pin 64 and to overcome the force exerted on the connected end of the extractor hook by spring 66 carried within a suitable recess 68 in the extractor head 59. It will be understood that spring 66 functions to normally maintain hook 60 in longitudinal alignment with the extractor head 59. This action enables the hook 60 to be advanced to a position in which the recessed portion 70 thereof underlies T-lug 52 at which time spring 66 causes the hook to be rotated sufficiently in a clockwise direction to establish connection between hook 60 and the T-lug.

Figure 8A:
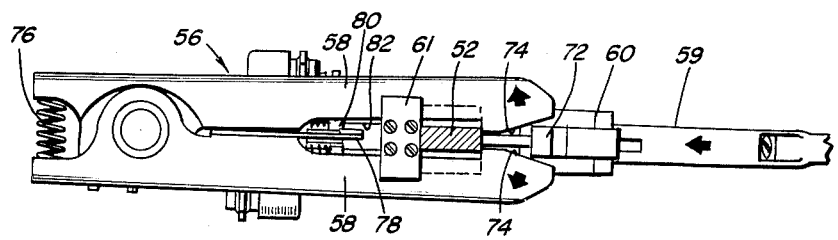
FIG. 8A is a top plan view of the missile stop and latch mechanism located in each missile cell and illustrates the extractor head entering an occupied missile cell to remove the missile therefrom.
Figure 8B:
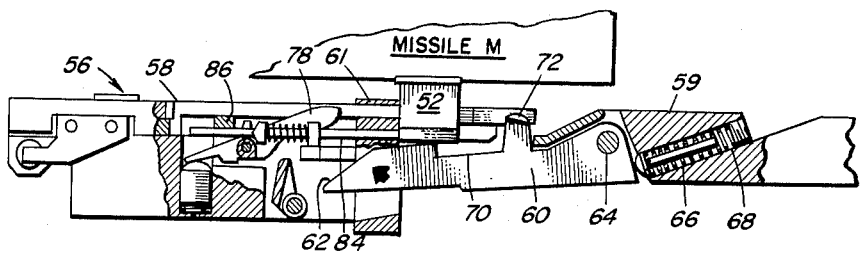
FIG. 8B is a side elevation view with parts broken away, of the missile stop and latch mechanism with all the elements in the same position as in FIG. 8A.
Figure 8C:
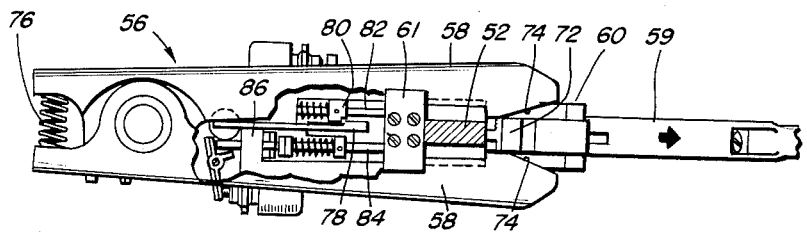
FIG. 8C is a changed-position top plan view of the missile stop and latch mechanism located in each missile cell and illustrates the extractor head engaged and connected with the booster T-lug and ready to withdraw the missile from the cell.
Figure 8D:
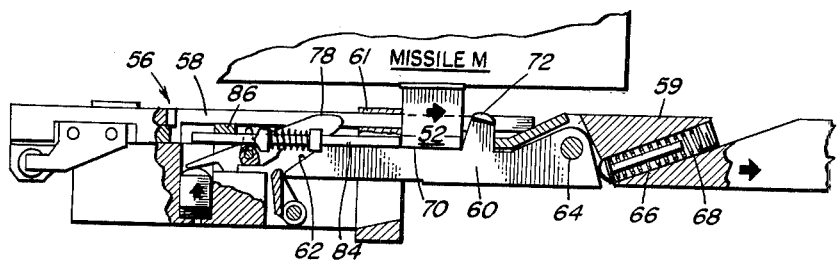
FIG. 8D is a side elevation view with parts broken away, of the missile stop and latch mechanism with all the elements thereof in the same position as in FIG. 8C.

An upwardly extending tong opener 72 is provided on hook 60 and is so disposed as to engage cam surfaces 74 at the free ends of tongs 58 to effect a spreading of the tongs against the force exerted by spring 76 as the extractor hook is advanced toward the position at which it will be connected with the T-lug. As best illustrated in FIGS. 8C and 8D, the tongs are spread to permit release of the T-lug therefrom when the extractor hook has become connected to the T-lug.

Figure 9A:
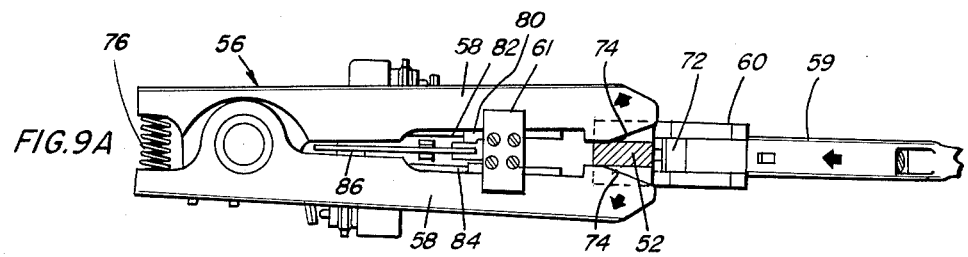
FIG. 9A is a top plan view of the missile stop and latch mechanism located in each missile cell and illustrates the extractor head moving a missile into an empty cell.
Figure 9B:
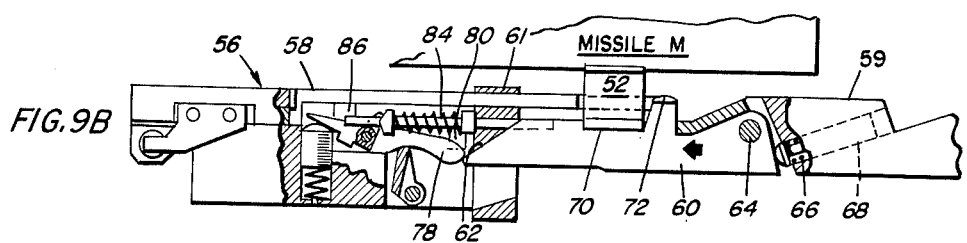
FIG. 9B is a side elevation view, with parts broken away, of the missile stop and latch mechanism with all the elements thereof in the same position as in FIG. 9A.
Figure 9C:
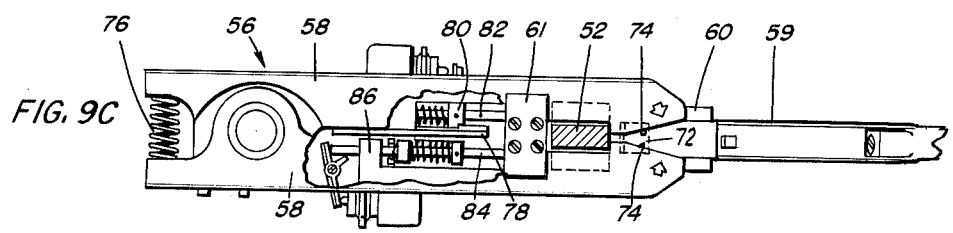
FIG. 9C is a changed-position top plan view of the missile stop and latch mechanism and illustrates the missile latched in the cell and the extractor head ready to withdraw.
Figure 9D:
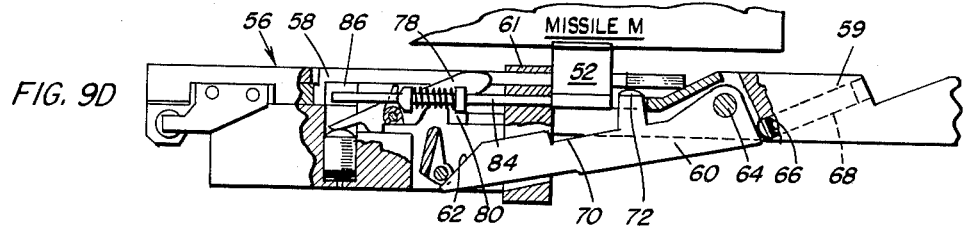
FIG. 9D is a side elevation view, with parts broken away of the missile stop and latch mechanism with all the elements thereof in the same position as in FIG. 9C.

As shown in FIGS. 9A and 9B, the side surfaces of the vertical web of the T-lug engage surfaces 74 of the tongs 58 to spread the latter when the missile is being stowed in an empty cell. As the missile approaches its stowed position and just prior to the T-lug engaging stop member 61, surface 62 on the extractor hook engages the release lever 78 which is maintained in the position shown in FIG. 9B by the release lever stop 80. As the extractor hook is further advanced into the stop and latch mechanism, the movement of surface 62 against the release lever causes the extractor hook to be cammed downwardly to release the T-lug. As this occurs the tong opener 72 also moves downwardly to a position beneath the free ends of the tongs. As the missile reaches its final or stowed position, the horizontal member of the T-lug pushes spring loaded plungers 82 and 84 into the block 86 of the stop and latch mechanism. The full movement of plunger 82 removes release lever stop 80 from its position in which it maintains the release lever in a fixed downward position. Plunger 84 actuates a suitable interlock to notify the operator that the missile has been stowed. Also, as the missile reaches its stowed position, the tongs 58 close around the vertical web of the T-lug. The extractor head is held down by tong opener 72 bearing against the undersurface of the tongs. Now extractor hook 60 may be withdrawn from the cell. A stop and latch mechanism 56 is provided at the aft end of each cell of all cell racks. Each cell contains suitable interlock switches so that the missile-in-cell, extractor-hook-engaged, and missile-tongs-locked conditions may be properly indicated on the system control panels, not shown.

Each cell 42 of missile magazine cell rack 32 is individually protected by a pair of vertically-hinged flameproof doors 8. These doors provide fire and blast protection in the case of accidental ignition of a missile. The cell doors are spring biased in a normally closed position, and are individually opened by means not shown when a missile is to be removed from a cell. A suitable latching mechanism, not shown, may be provided to latch the doors in the closed position.

Figure 3C:
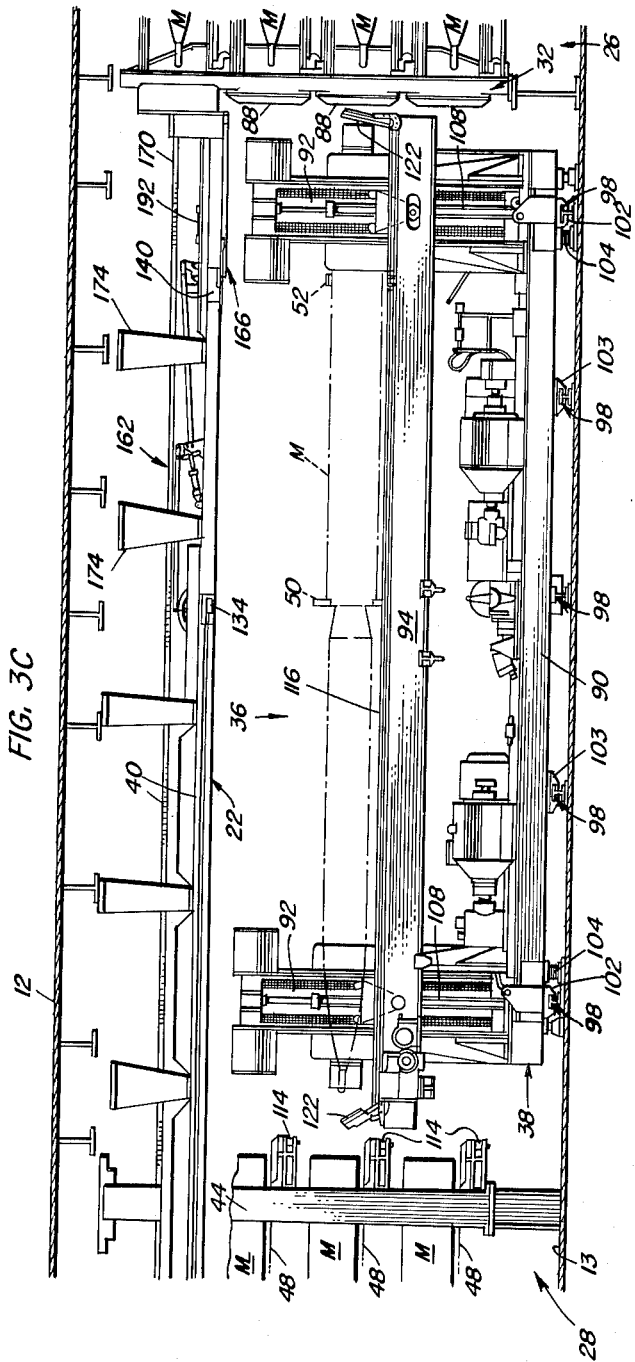
FIG. 3C is a side elevation of the missile transfer car and illustrates among other elements, the aft portion of the forward magazine area, the aft portion of the first stage rammer, and the forward end portion of the aft magazine area.
Figure 4B:
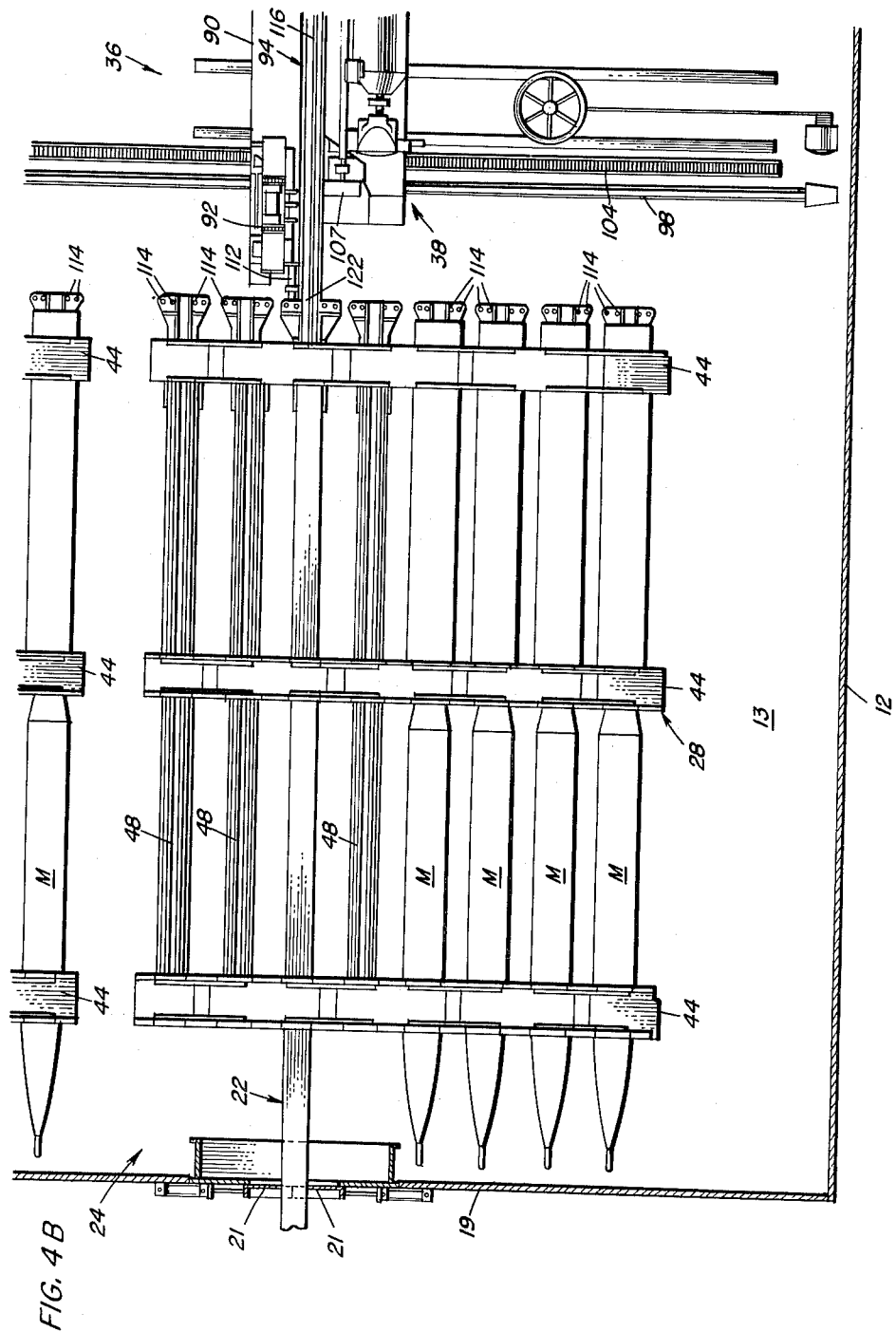
Figure 4C:
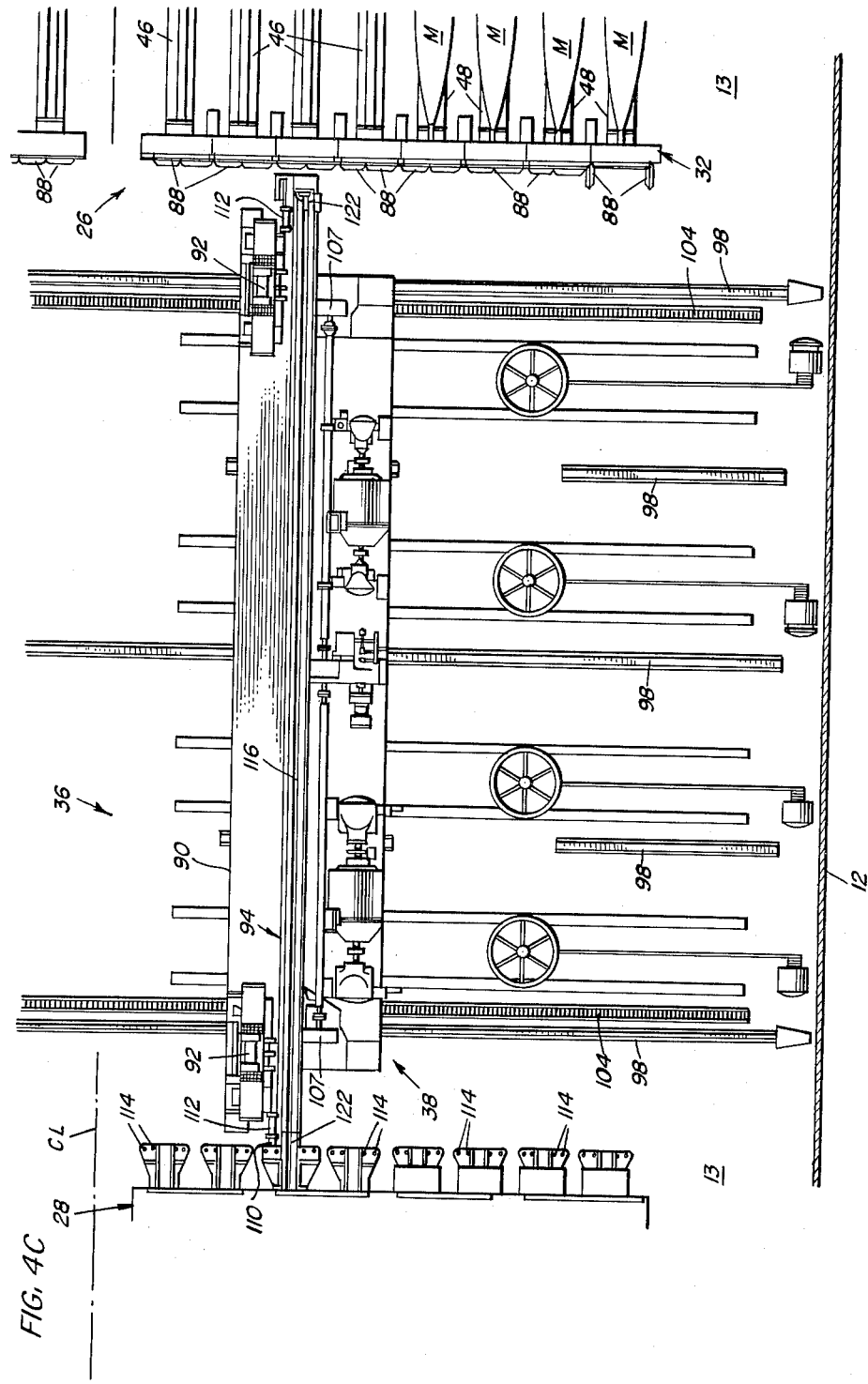
Figure 4D:
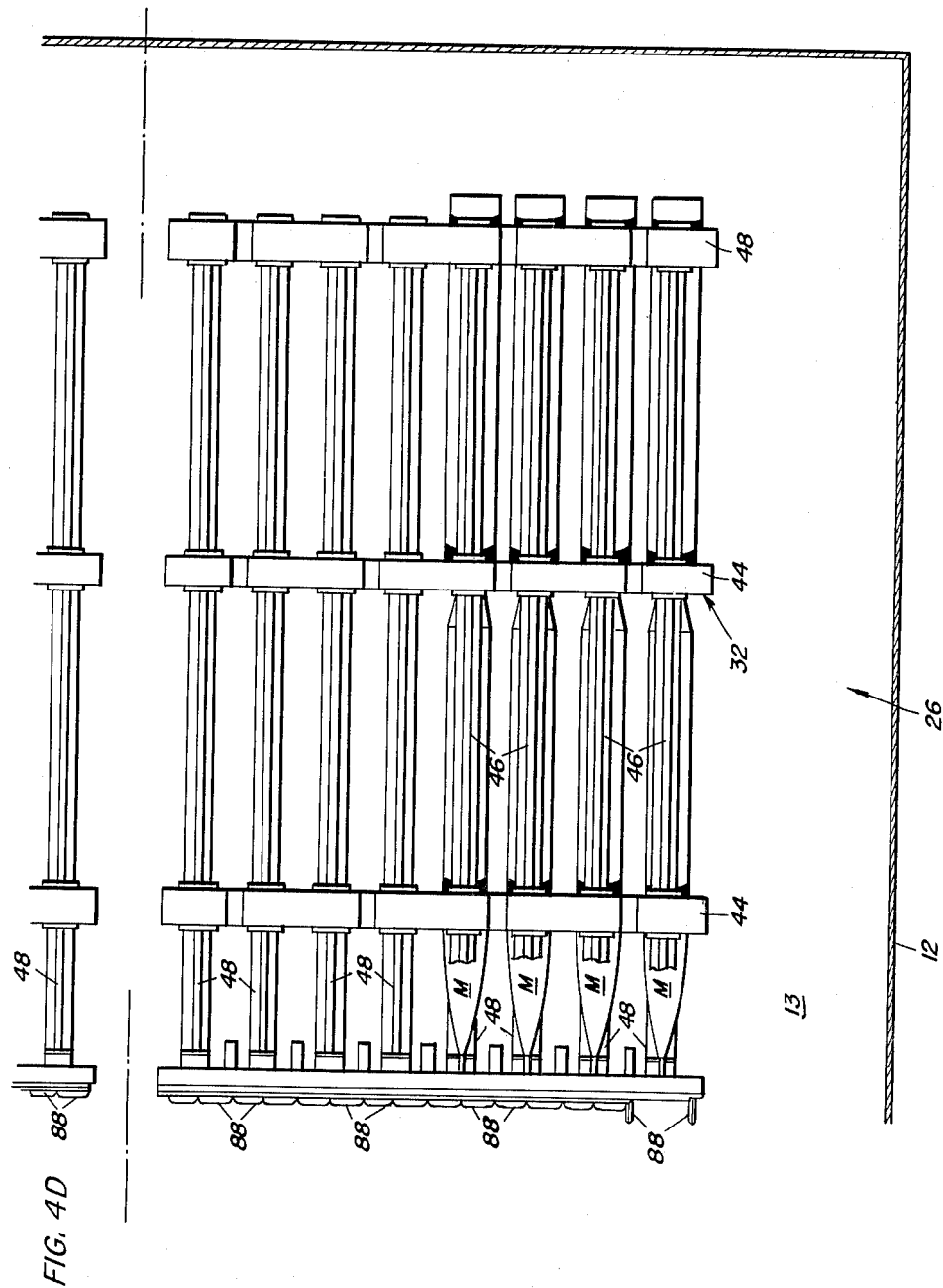
Figure 10:
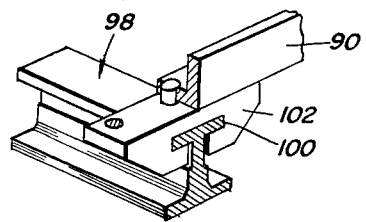
FIG. 10 is a perspective view of one of the transfer car hold down clips in position on a section of one of the transfer car rails.
Figure 11:
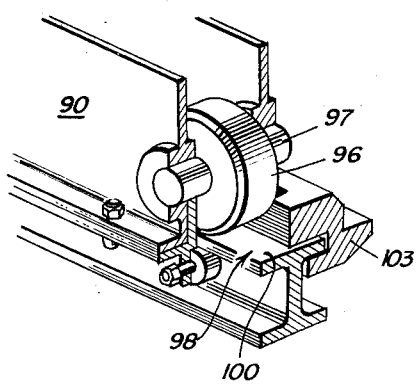
FIG. 11 is a perspective view of one of the transfer car wheel and hold down clip assemblies in position on a section of another one of the transfer car rails.
Figure 12:
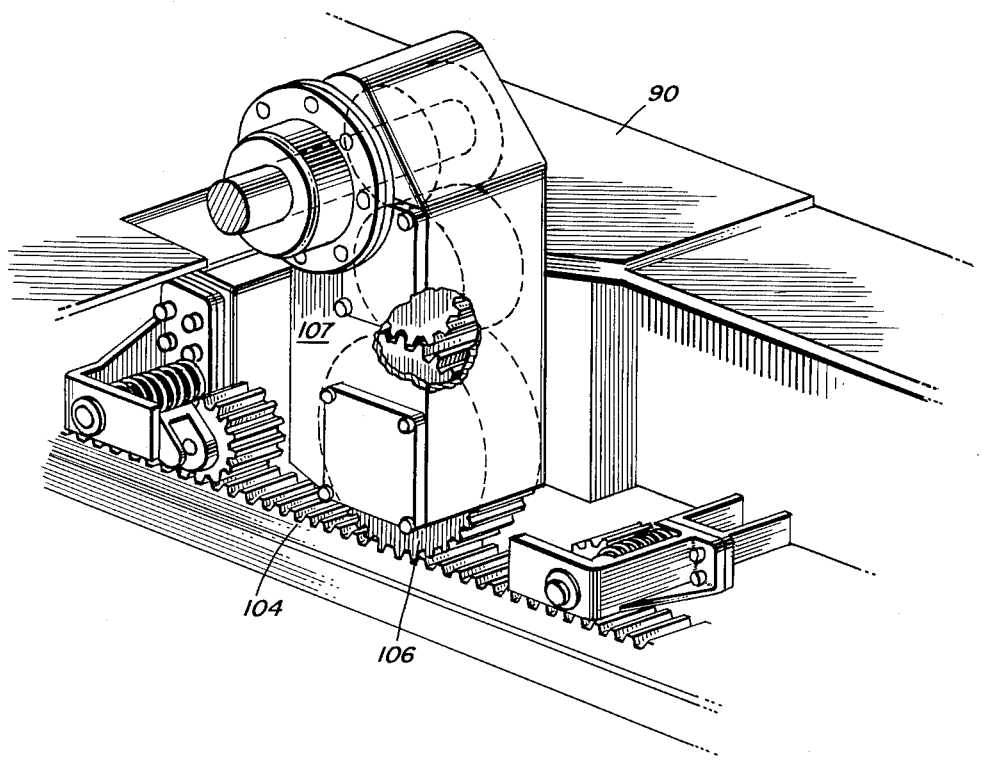
FIG. 12 is a perspective view of one of the transfer car rack and pinion drive units, partially cut away to illustrate the engagement of the rack and pinion.

The two missile cell racks 28 and 32 are normally serviced by a single transfer car, generally designated by numeral 38, and best illustrated in FIGS. 3C and 4C. Each car 38 transfers missiles from the cell racks to the first stage 40 of the rammer mechanism 22. Transfer car 38 consists mainly of a carriage 90, two independently powered hoists 92 mounted on the carriage, the extractor beam 94 and suitable power drives including interlocks and automatic controls. The carriage includes wheels 96 which are on sections of track 98 laid transversely to the longitudinal center line of the system. The tracks have flanges 100 thereon which are engaged by suitable stowage hold down clips 102, FIG. 10, mounted on the carriage 90 and which prevent lifting motion of the carriage off of the tracks. FIG. 11 illustrates a roller and hold down clip assembly which is employed at predetermined locations on the rails, normally at each end of the transfer car carriage 90 and on the rail which underlies the center of gravity of the carriage. The wheel 96 is rotatably mounted on depending portions of carriage 90 by a journal 97 and is closely fitted within the hold down clips 103 which extend in front and back and along both sides of the wheel. Hold down clips 103 are securely mounted to the carriage frame by any suitable means. Adjacent the outside tracks, racks 104, FIG. 12, are mounted and are engaged by pinions 106 driven through a gear reduction 107 mounted on the carriage and driven by suitable motors. Thus the carriage can be moved along the tracks to service the magazines and the individual cells therein. The hoists 92 are operated by means of individual hydraulic cylinders 108.

Figure 5A:
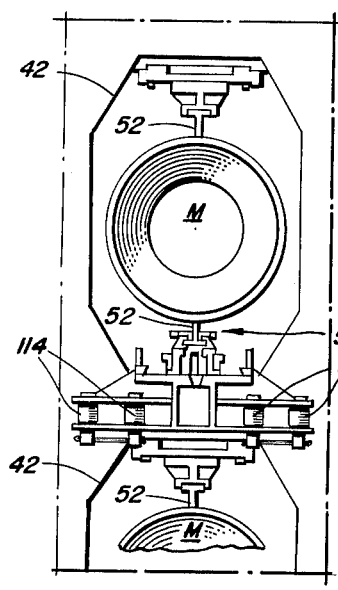
FIG. 5A is a view of a missile stowed in a cell of the forward magazine as viewed from a line substantially croresponding to line 5A—5A in FIG. 3B and illustrates the manner in which the missile is supported in the cell by the T-lug at the aft end of the booster.
Figure 5B:
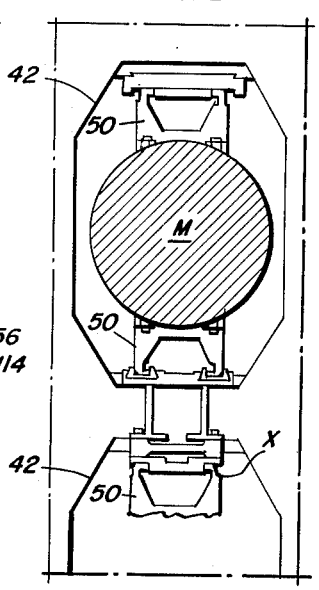
FIG. 5B is a view similar to FIG. 5A but viewed from line 5B—5B of FIG. 3B and illustrates the manner in which the missile is supported in the cell by the U-lug at the forward end of the booster.
Figure 5C:
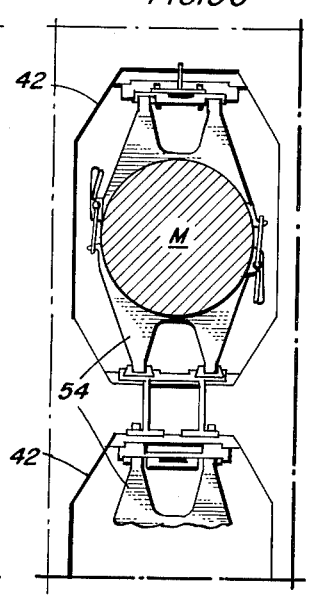
FIG. 5C is a view similar to FIG. 5B but viewed from line 5C—5C of FIG. 3B and illustrates the manner in which the missile is supported in the cell by the holding band at the forward end portion of the bird.
Figure 6:
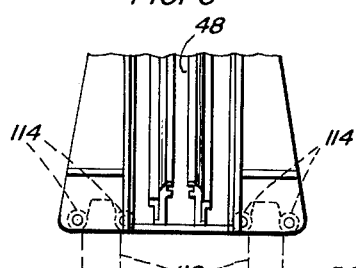
FIG. 6 is a top plan view of the alignment rollers of FIG. 5A with parts broken away to illustrate the manner in which the alignment latches on the transfer car cooperate with the alignment rollers at the cell entrance to properly align the car with the cell during missile transfer operations.
Figure 7:
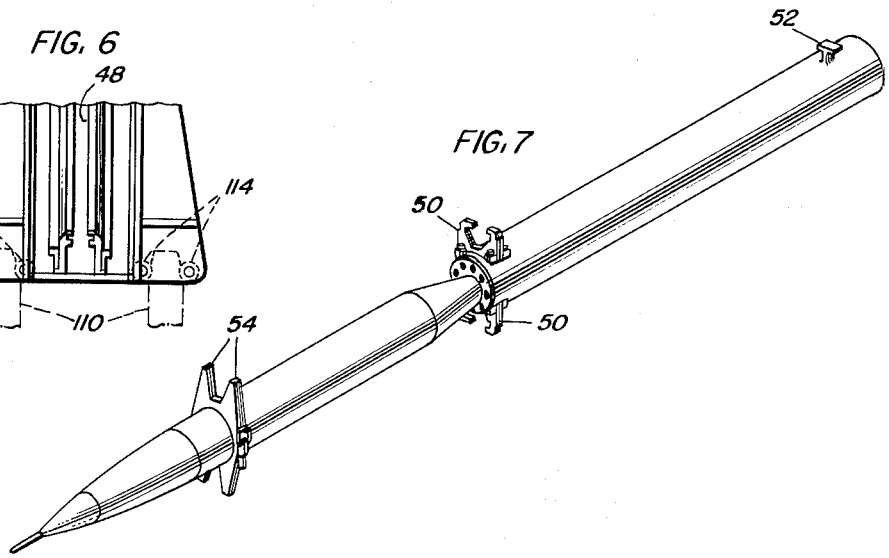
FIG. 7 is a longitudinal perspective view of a missile illustrating the locations and configurations of the missile T-lug, U-lug, and holding band.

The extractor beam 94 is supported by the hoists or lift assemblies 92 and is provided at each end with an extractor beam aligning latch 110 which is extended and retracted by the actuation of cylinder 112. Rollers 114 are mounted at the entrance to each cell and at the entrance to the ramway, later to be described. When beam aligning latch 110 is extended into the space between rollers 114, alignment of the missile rails 116 which are secured to the uper surface of the extractor beam and the lower rails 48 of the adjacent cells is assured. Although four rollers 114 are provided at the entrance to each cell, as shown in FIGS. 5A and 6, only two rollers are engaged by the extractor alignment latch 110 of either transfer car. The four rollers are required because the tail end latches 110 are mounted on the left hand side of the extractor beam facing the cell door assemblies whereas the nose end latch 110 for each beam 94 is mounted inboard. The four roller arrangement provides for the alignment of either transfer car with all cells in the event of breakdown of the other car. In addition to the missile rails 116, the extractor beam is provided with chain guides 118, FIG. 15, enclosing a hydraulically driven extractor chain 120. One end of the extractor chain is connected to the bottom of and intermediate the ends of the extractor head 59. An extractor hook 60 is pivotally secured to each end of extractor head 59. The other end of chain 120 is free. Pivotally mounted at each end of the extractor beam 94 is a spanning rail 122. Each spanning rail 122 is pivotally connected to a hydraulic cylinder 124 as at 126. The beam end of spanner rail 122 is supported by rollers 128 riding in curved slots 130 on each side of the extractor beam. The hydraulic cylinder 124, when actuated, pivots spanner rail 122 downwardly to span the gap between the missile rails 116 on the extractor beam 94 and the lower rails 48 of the selected missile cell to provide a continuous rail assembly on which the missile may be moved during its transfer from the cell onto the transfer car or vice versa. When the spanner rail 102 is properly seated and aligned with the structure of the selected cell, the extractor head 59 can be moved into and out of the cell. Any suitable latches for securing the missile to the extractor beam 94 may be provided, as may any desired interlock and switch arrangements for indicating on a control panel the completion of certain phases of the transfer operation.

When the missile M on extractor beam 94 is lifted for transfer of the missile to the first stage rammer 40, as illustrated in FIG. 18, the upper U-lug 50 passes vertically into recesses 132 provided in floating rails 134. Recesses 132 register longitudinally with the U-lug guiding surfaces of the missile guiding and supporting rail 136 of the first stage rammer.

Simultaneously, the upper T-lug 52 moves vertically into recess 138 provided in floating rails 140. Recesses 138 register longitudinally with the T-lug guiding surfaces of rail 136 of the first stage rammer.

When the U-lug and T-lug have been lifted into recesses 132 and 138, respectively, the extractor chain 120 is driven to move the missile a short distance in the forward direction thereby moving the U-lug and T-lug onto their respective guide surfaces of rail 136.

The rails 116 on the extractor beam are so constructed and provided with suitable missile lug latch mechanisms, not shown, that the T-lug and U-lug will move upwardly out of the rail as the extractor beam 94 is lowered after the missile has been moved forwardly a short distance into rail 136.

As the U-lug enters recess 132 an interlock switch actuator 142 is depressed, and as the U-lug moves into the guide rail 136 on floating rail 134, interlock switch actuator 144 is depressed thereby to notify the operator of the location of the missile. A retractable stop member 146 is provided between the interlock switch actuators 142 and 144 to prevent a missile from moving rearwardly out of the guide rail 136 in the event of a maulfunction of the T-lug latches to be now described.

Referring now to FIGS. 22, 23 and 24, it will be observed that two latch members 148 and 150 are provided in floating rails 140 and are laterally biased by springs 152 into the path followed by the vertical web of the T-lug. Latch member 148 is provided with an inclined cam surface 154 so that forward movement of the T-lug from receess 138 into rail 137 on the floating rail will cam this latch member outwardly against the action of its spring and permit the vertical web of the T-lug to pass to a position between latch members 148 and 150 in response to the forward movement of the extractor head 59 on extractor beam 94, hereinbefore described. Latch member 150 is provided with cam surface 156 to accommodate rearward movement of a T-lug during the unloading of the launcher. To remove the latches 148 and 150 so that the T-lug may be moved from between latches 148 and 150, linkage, generally designated by numeral 158 is connected between the latch housing 159 and a hydraulic actuator 160.

Any suitable linkage and actuation means such as that generally indicated at 162 may be employed for adjusting the position of the floating rails 134 and 140 to receive the missile lugs during transfer operations.

The first stage rammer is provided with an endless roller chain 164 having a rammer head 166 secured thereto and carried therebeneath in the missle T-lug guide 137 for establishing positive connection between the chain and vertical web of the upper missile booster T-lug 52. The lower half of the chain loop runs through a lower chain guide 168 while the upper half runs through an upper chain guide 170. The rammer chain is driven through a sprocket drive mechanism, one sprocket of which is shown at 172, by a suitable hydraulic motor. The first stage rammer 40 is secured to the overhead of the missile house 12 by suitable supports 174.

As will be apparent from an inspection of FIGS. 25 and 26, rammer head 166 includes an elongated bar member 178 pinned to the first stage rammer chain 164 at 180. The pivoted arms or hooks 176 are pivotally connected to the bar at 182 so as to swing in the horizontal plane. Two coil springs 184 interposed between bar 178 and cam blocks 186 carried by the hooks function to maintain the hooks in a normally closed position.

The cam blocks are provided with suitable cam surfaces for cooperative engagement with a pair of cam actuators 188 connected via bellcrank 190 to the piston of a hydraulic cylinder 192. Thus, should it be necessary to disconnect the first stage rammer head from the missile, as when the missile is to be transferred from the first stage rammer to the transfer car during unloading operations, for example, cam actuators 188 are moved in a downward direction to produce a wedging action between the inner surface of actuators 188 and the outer surface of cam blocks 186. This wedging action forces the aft ends of hooks 176 to be forced toward one another against the action of springs 184 and the forward ends of the hooks to be spread apart to release the T-lug of the missile.

It will be noted that transversely extending supporting surfaces 194 are provided on bar 178, and these are supported and guided in the horizontal portion of T-lug slot 137 on the rammer rail.

When the missile is in place on the first stage ramming rails and the extractor beam of the transfer car has been lowered clear, the rammer head 166 is moved forward by the actuation of the rammer chain 164 and the pivoted arms 176 of the rammer head are spread apart by the vertical web of the booster T-lug. Upon further movement of the rammer head, arms 176 snap around the web of the booster T-lug to connect the missile to the first stage rammer head. Thereafter, the missile is rammed along the ramway and through the opening provided by door 21 in bulkhead 19, which separates the magazine area from the assembly or finning area, and onto the rail of the second stage rammer.

The transfer of the missile from the first stage rammer to the second stage rammer, as shown in FIGS. 27 through 37, is accomplished by means of a pair of swinging track sections 196 pivoted to a portion of the second stage rammer housing 198 by pin 200 and to an actuating element 202 by link 204. Actuating element 202 contains a partially compressed spring 203 which normally maintains link 204 in a raised position. The second stage rammer head 206 is provided with a pair of rollers 208 rotatably mounted on each side of the rammer head. Rammer head 206 is connected to roller chain 210 which is driven by the drive sprocket 212. The forward most of the rollers on the second stage rammer chain are spaced from rollers 208 on the rammer head in such a manner that rollers 208 will follow the surfaces established by swinging tracks 196 when the latter are in an inclined position as shown in FIGS. 27, 30, and 35. Thus, when the second stage rammer head is fully retracted, the relationship of parts is that shown in FIG. 27, for example. It will be observed that when the second stage rammer head is fully retracted the forward end or hook portion of this rammer head is elevated to a position which will permit the missile T-lug and the first stage rammer head to pass therebeneath. Booster warm-up terminals (not shown) are contained within a housing 214 and establish electrical contact with electronic components within the missile via the warm-up pad (not shown) on the booster when the latter is secured to the second stage rammer head so that these components will be warmed-up and fully operative when the missile reaches the launcher. It will be noted that the rammer head rollers 208 follow the same track or guide surfaces 215 as the rollers on the rammer chain 210.

The second stage rammer head 206 is pivoted on pin 216 to permit it to engage and disengage the booster T-lug 52. The rammer head 206 is normally maintained in its downward position by a bifurcated latch member 218 connected to spring-loaded plungers 220. A pair of small rollers 222 are provided at the point of connection between latch member 218 and plungers 220, and these small rollers ride on guide surface 224 of the second stage rammer.

As a missile is moved into the second stage rammer, the bottom booster T-lug 52 moves into a transfer position and temporarily secured in that position by a lug latching mechanism, generally designated by numeral 226. This lug latching mechanism includes a pair of hydraulically independently spring loaded latches 228 longitudinally spaced from one another to snugly receive the bottom T-lug therebetween, as shown in FIG. 33. The missile T-lug is shown entering latching mechanism 226 in FIG. 31. Latches 228 are beveled as at 230 so that the moving T-lug can depress the first latch encountered but will be stopped by the vertical face of second latch, regardless of whether the missile is moving in either a forward or an aft direction. A sensing button 232 is depressed as the T-lug is moved into a latched position to close a switch and thereby advise the operator at the control panel (not shown) that the missile is at the finning position. It will be understood that the missile is thus secured at the finning position in the assembly area 14 until all operations, such as removing the support bands 54, installing wings and fins and performing any check-out steps on the missile, have been completed.

When it is desired to release the missile from the finning position so that the second stage rammer can complete the ramming operation and move the missile onto the launcher guide arm, the hydraulic cylinder and piston mechanism 234 is actuated to move in a downward direction plate 236 to which latches 228 are secured by studs 238. This downward movement of latches 228 is accomplished against the action of springs 240 which normally bias the latches in an upward direction, the springs being under compression between circular flanges 242 secured to the bottoms of the latches and stationary plate 244.

Referring now to FIGS. 29 through 34, it will be observed that simultaneously with the movement of the bottom T-lug 52 into latching mechanism 226, the first stage rammer head 166 is moved to a position in which the pivoted arms 176 of the first stage rammer head are disconnected from the vertical web of the upper T-lug 52. The release of the first stage rammer from the missile is accomplished by means of a release mechanism which includes a hydraulic cylinder and piston arrangement 246 connected via linkage 248 to cam members 250 so formed to engage and spread the arms of the first stage rammer as the missile is moved to the finning position. The cam members 250 may be lowered to their operative position, which is their normal position, or raised to their inoperative position by linkage 248. After the missile is latched by latching mechanism 226, the first stage rammer arms, which are now spread to their open position, as shown in FIG. 34, can slide past the top T-lug 52 on the retract stroke of the first stage rammer. The second stage rammer can now be connected to the top T-lug.

During unloading operations cylinder and piston mechanism 246 is actuated to extend the piston and to raise cam members 250 and lower the release cam 252 by the movement of the various elements of linkage 248. As the release cam 252 is lowered it engages the upper end of latch member 218 on the second stage rammer head. Further lowering of release cam 252 causes the second stage rammer head to be pivoted in an upward direction about pin 216 and thereby release the top T-lug. The missile at this position having been secured by the capture of the bottom T-lug by latching mechanism 226. At this time the arrangement of parts is such that the first stage rammer head can be advanced and connected to the top T-lug for completion of the unloading operation.

After the first stage rammer head has been retracted, the second stage rammer head is advanced and connected to the T-lug, as shown in FIG. 36. It will be apparent that the forward end of the second stage rammer head is so formed that it will be cammed over the horizontal web of the T-lug after engagement therewith and upon further advancement of the second stage rammer chain 210.

When the bottom T-lug is released by retraction of latches 228, FIG. 28, the second stage rammer can move the missile forward toward the launcher. As this movement is commenced, the forward rollers on the second stage rammer chain 210 engages the undersurface of swinging tracks 196 to swing the latter into the position shown in FIG. 37. Thus a continuation of the upper surfaces of the chain track is provided. This pivotal or swing movement of track 196 is accomplished against the action of spring 203 of the actuating element 204.

A pair of horizontally pivoted blast doors 254 protect the structure within the missile house from the blast when missiles are launched. These doors are maintained closed except when missiles are moved into and out of the missile house. These doors are opened simultaneously by a hydraulic cylinder 256, the piston 258 of which is connected to a clevis 260 mounted on the lower door. Suitable tie rods 262 are connected between the doors to assure simultaneous operation in response to actuation of piston 258. A spanner rail 264 is carried on the inside of the upper door and is so positioned as to provide a smooth continuation of the second stage rammer rail to the launcher rail when the launcher is in load position.

FIG. 38 illustrates the manner in which the second stage rammer head 206 is disconnected from the booster T-lug when the missile has been rammed to its final position against retractable stop 265 on the launcher. A launcher position spade 266, which may be raised and lowered by any suitable mechanism (not shown), is located within guide arm 33 of the launcher. Positioning spade 266 is so formed that, when lowered, the forward edge of 267 thereof engages the aft side of the T-lug 52 to prevent movement of the missile in the aft direction after being placed in the launch position on the launcher guide arm. This spade is provided with another surface 268 which, when lowered, engages the upper end of latch member 218 to depress the latter and raise the second stage rammer head 206 about pin 216 to disconnect the rammer head from the T-lug. Thereafter the second stage rammer head may be retracted to its initial position, as shown in FIG. 27, to receive the next missile.

Operation

The transfer car 38 is normally stowed under the first stage rammer 40. On receipt of a signal to load, the car 38 is first traversed until it is clear of the first stage rammer 40 and then traverses and lifts the extractor beam 94 to a selected cell in one of the aft cell racks 32, for example. The tail and nose spanning rails 122 remain in their raised positions during movement of the extractor beam.

As soon as the extractor beam 94 stops at the selected cell the extractor beam aligning cylinders 112 are actuated to extend the latches 110 to secure the extractor beam in place. When the extractor beam is securely latched at the selected cell, the cell doors 88 of the selected cell are opened and the tail spanning rail 122 is lowered to span the gap between the magazine cell rail 48 and the rail 116 on the extractor beam. The extractor head 59 is then driven into the selected cell to pick up the missile lower booster T-lug 52, and the missile is extracted from the cell and moved onto the extractor beam. The transfer car is then traversed until it reaches the transfer position beneath the first stage rammer 40. It is to be noted that the transfer car is not traversed until the missile cell doors 88 are closed after the missile has been removed from the cell. After the transfer car arrives at the transfer position the extractor beam is lifted and the missile is placed on the first stage rammer rails 136 and 137 and latched in position thereon. The extractor beam is so constructed that when the missile is latched on the first stage rammer, the extractor beam may be lowered clear. The transfer car is now free to select and extract another missile and repeat the process.

The first stage rammer head 166 now moves forward to engage and become connected with the upper missile booster T-lug, latches 148 and 150 holding firmly. The magazine doors 21 open and when fully opened, operate interlocks to retract the first stage latches 148 and 150.

When the first stage latches are fully retracted, the first stage rammer 40 rams the missile to the assembly or finning area 14. As the missile approaches the second stage latched position in the finning area, the first stage pivoted rammer hooks or arms 176 are spread apart by the cam members 250. As the first stage rammer hooks 176 spread, the elongated bar 178 of the first stage rammer continues to push the upper T-lug until the lower T-lug is engaged by the second stage lug latch mechanism 226.

With the missile securely latched to the second rammer stage, the first stage rammer head 166 retracts empty, the spread first stage rammer head arms 176 being incapable of gripping the T-lug. As soon as the first stage rammer head has been retracted beyond the magazine doors 21, these doors close and the second stage rammer head 206 extends and becomes attached to the upper T-lug. At this time the warm-up terminals contained in housing 214 carried by the second stage rammer establish electrical connection with the booster and warm-up power is supplied to missile components. Continued extension of the second stage rammer head 206 causes toggle linkage 218 to lock the hook portion of the second stage rammer head over the upper T-lug.

As soon as the missile is latched in the assembly or finning area 14 the missile is prepared for flight by the installation of wings and fins thereon. In addition, the missile support bands 54 are removed at this time. Finally, the missile is armed.

During the preceding operations the launcher has been trained and depressed to the load position, and when the launcher reaches this position, the blast doors 254 open and the spanning rail 264 wedges itself in line with the second stage rammer 20 and the launcher guide arm 33. When the spanning rail is in this position, the second stage lug latches 228 are withdrawn by the actuation of cylinder 234, and the second stage rammer then extends fully to load the missile on the launcher.

When the missile reaches the launch position on the launcher guide arm 33 the launcher positioning spade 266 moves downwardly to hold the top booster T-lug from the rear and simultaneously presses down on the second stage rammer latch mechanism 218 to force the hook end of the second stage rammer head 206 upward and latch the toggle linkage on the other side of center. The second stage rammer head is then free to retract.

When the second stage rammer head is retracted beyond the blast doors 254, the blast doors close and lock. The launcher may now be trained and elevated to the launch position. Next the second stage rammer head 206 is fully retracted during which time rollers 208 ride up the swinging track sections 196 which are dropped into the gap between the rollers on chain 210 and rammer head rollers 208.

During unloading, the mechanical operations are the reverse of those previously described with the exception of the second and first stage rammer hook release operations.

Thus, during unloading operations, after the missile has been moved from the launcher guide arm 33 to the finning position and latched at that position by the second stage latches 228, the roller release cam 252 is lowered to move the latch mechanism or toggle linkage 218 of the second stage rammer head 206 beyond center to thereby raise and hold the hook portion thereof so that the rammer head can retract fully up the swinging track sections 196. Simultaneously therewith the cam members 250 are lifted clear of the passage of the first stage rammer head 166 which extends immediately following the full retraction of the second stage rammer head 206 and the opening of the magazine doors 21. The hooks or swinging arms 176 of the first stage rammer head 166 are then spring latched around the vertical web of the upper booster T-lug, the second stage lug latches 228 are retracted and the first stage rammer retracts moving the missile with it. When the missile has been moved to the position wherein the upper T-lug is captured by the first stage rammer latches 148 and 150, the first rammer stage cam actuating cylinder 192 is actuated to move the release cams 186 downwardly to thereby spread the forward end of the arms 176. The first stage rammer head 166 then continues to retract and both release mechanisms 186 and 252 are returned to loading position. The magazine doors 21 close, and the extractor beam 94 is lifted to receive the missile. The extractor head 59 is connected to the bottom T-lug of the missile and moves the missile along the first stage rammer rail to the transfer position whereupon the missile is transferred to the extractor beam. The extractor beam is lowered and the transfer car 38 traverses to an empty cell into which the missile is placed by the extractor head 59.

Obviously many modifications and variations of the present invention are possible in the light of the above teachings. It is therefore to be understood that within the scope of the appended claims the invention may be practiced otherwise than as specifically described.

What is claimed is:

1. A missile launching system having all major components thereof longitudinally arranged and secured on a single level of support and comprising, in combination, an elevatable and trainable launcher, launching rails on said launcher, a ramming mechanism having missile supporting and guiding rails, said ramming mechanism rails being in longitudinal alignment with said launcher rails when the launcher is positioned at zero degrees elevation and train, a first missile magazine having a plurality of missile cells disposed in parallel relation with said ramming mechanism, a second missile magazine having a plurality of missile cells and a ramway disposed in parallel relation with said ramming mechanism and longitudinally spaced from said first magazine in a direction toward said launcher, said ramming mechanism extending through said space separating said magazines, said ramway in said second magazine and to said launcher, transfer means movably disposed in said space between said magazines and selectively operable in transverse and vertical directions for movement between a selected cell and said ramming mechanism, and extendable extractor means carried by said transfer means for moving missiles from said magazines onto said transfer means for further movement to said ramming mechanism.

2. A unilevel missile launching system having all major components thereof longitudinally arranged and secured on a single level of support and comprising, in combination, a first missile magazine having a plurality of missile cells, a second missile magazine having a plurality of missile cells and longitudinally spaced in a forward direction from said first magazine, said missile cells being disposed in adjacent vertical columns and horizontal rows, each of said cells in said first magazine having an independently operated blast door separating the interior thereof from the space between the magazines, a finning compartment disposed forwardly of said second magazine, a launcher elevatable and trainable from a loading position to a launching position and having launching rails provided thereon, said launcher being the forwardmost major component of the system, a ramming mechanism extending from the launcher end of said first missile magazine through the space between said magazines and thence through said second magazine, and said finning compartment, a spanner rail for spanning the space between said ramming mechanism and said launcher rails when said launcher is in loading position, transfer and extractor means disposed in the space between said magazines for selectively extracting a missile from a predetermined magazine, moving and securing the selected missile to said ramming mechanism, and means for actuating said ramming mechanism to effect straight-line and horizontal movement of the missile to said launcher, said missile cells, ramming mechanism, and transfer means having missile guide rails parallel with one another, the spanner rail and guide rails of the ramming mechanism being longitudinal and colinear extensions of the launching rails when the spanner rail and launching rails are in a loading position.

3. The missile launching system of claim 2 wherein said missile magazines include stop and latching means comprising a pair of missile lock tongs, spring means attached to said tongs for biasing said tongs in a latched condition with respect to a predetermined portion of a missile, wedge surfaces on said tongs for engagement with said predetermined portion of the missile as the latter is moved into the cell and for effecting movement of said tongs to an unlatched condition in response to movement of the missile into the cell subsequent to initial engagement of said wedge surfaces with said predetermined portion of the missile, buffer means to engage the missile for limiting the extent of movement of the missile into the cell, and surfaces on said tongs for enabling said tongs to be moved to said latched condition by said bias means when said predetermined portion of the missile has completed its movement in engagement with said wedge surfaces.

4. The missile launching system of claim 3 wherein said missile stop and latching means further comprises camming means for effecting connection and release of said transfer means with a missile in the cell.

5. The missile launching system of claim 4 wherein each of said cells and said transfer means include cooperating alignment means for assuring alignment of the transfer means with a predetermined missile cell prior to extraction of a missile from the predetermined cell.

6. The missile launching system of claim 5 wherein said transfer means further includes a carriage, means for moving said carriage between said missile magazines and said ramming mechanism, an elevatable extractor beam carried by said carriage, means to elevate said extractor beam to between the lowermost and uppermost rows of missile cells, and extendable spanning tray carried by each end of said extractor beam for spanning the space between the end of the extractor beam and the selected missile cell in the predetermined magazine, and independent means for extending and retracting each of said spanning trays.

7. The missile launching system of claim 6 wherein said transfer means further includes an extendable extractor head carried by said extractor beam for moving a missile from said extractor beam into a selected cell during magazine loading operations and from a selected cell onto said extractor beam during launcher loading operations, and drive means carried by said extractor beam for moving said extractor head into and out of a selected cell in the predetermined magazine.

8. The missile launching system of claim 7 wherein said extractor beam, spanning trays and missile cells comprise a group of guideways and securing slots for cooperative engagement with said missile, said extractor head and said extractor head drive means, said guideways and slots being adapted for guiding said missile and extractor during longitudinal movement and securing said missile and extractor against lateral movement as said missile is moved into and out of any missile cell.

9. The missile launching system of claim 8 wherein said second missile magazine comprises a plurality of missile cells disposed in longitudinal alignment with corresponding missile cells in said first magazine, said second magazine being separate from said firing compartment by a blast resistant bulkhead, a blast resistant magazine door located under said ramming mechanism in said bulkhead and in longitudinal alignment with said ramway in said second magazine, and means for opening and closing said magazine door.

10. The missile launching system of claim 9 wherein said ramming mechanism comprises a first stage rammer extending from the side of said first missile magazine nearest said launcher, through said ramway and magazine door and into said finning compartment, a second stage rammer extending from the end of said first stage rammer within the finning compartment and extending to the end of the finning compartment nearest the launcher, means for transfering a missile from the extractor beam of said transfer means to said first stage rammer, means transferring the missile from said first stage rammer to said second stage rammer, and means for driving said first and second stage rammers in ramming and reverse directions.

11. The missile launching system of claim 10 wherein said first and second stage rammers each further comprises a rammer rail, a group of guiding and securing slots for engagement with and movement of a missile along said rail, a rammer chain, a rammer chain housing, a rammer head connected to said rammer chain, rammer chain and rammer head guideways in said rammer rail, said rammer chain being contained at least partially within said rammer chain housing, the remainder of said rammer chain and said rammer head being disposed in said rammer chain and rammer head guideways, and means for driving said rammer chain and rammer head through said guideways.

12. The missile launching system of claim 11 wherein said means for transferring a missile from the extractor beam to the first stage rammer comprises vertical slotted portions in said first stage rammer rail intersecting said guiding and securing slots and overlying predetermined portions of a missile in transfer position on said extractor beam whereby said predetermined portions of the missile can be moved into said vertical slots and in longitudinal alignment with said guiding and securing slots in response to elevation of the extractor beam when the cariage is in a predetermined position under the rammer rail of the first stage rammer and then said predetermined portions of the missile can be moved into said guiding and securing slots in response to movement of said extractor head, means for latching the missile on the first stage rammer rail and disconnecting said extractor head therefrom.

13. The missile launching system of claim 12 wherein said first stage and second stage rammer heads comprise hook portions pivotally connected to the respective one of said rammer chains, and means for sequentially unlatching said rammer head of said first stage rammer and latching said rammer head of said second stage rammer respectively from and to a missile at a predetermined location along said rammer rails and within said finning compartment.

14. In a stores handling system, a storage rack having a plurality of compartments, a transfer car for receiving stores from said rack, said transfer car being alignable with any one of said rack compartments, and means for assuring alignment of said car and a predeterimned rack compartment, said means comprising horizontally spaced rollers on said rack and adjacent said predetermined compartment, and an aligning latch on said car and snugly moveable into the space between said rollers when the transfer car is in alignment with the predetermined rack compartment.

15. In a missile handling system, a magaine for storing missiles, guide rails in said magazine for supporting and guiding said missiles, transfer means extendable into said magazine for inserting into and removing from said magazine a missile, said transfer means being resiliently biased in a missile securing position, missile stop and latching means in said magazine for limiting the movement of a missile being moved on said guide rails and for releasably latching a missile in stowed condition thereon, said stop and latching means comprising buffer means for engaging a predetermined portion of said missile for limiting the extent of movement of the missile into the magazine, pivotally connected missile lock tongs resiliently biased toward a closed and latched position around said predetermined portion when said portion is is stowed position against said buffer means thereby locking said missile in said stowed position, and means in said magazine and on said transfer means for effecting release of said transfer means from said missile when the latter is in stowed position.

16. In a stores handling apparatus, a storage rack, transfer means engageable with an object to be stored for transferring said object to said rack, a stop and latching device engageable with a predetermined portion of said object, said stop and latching device comprising buffer means for limiting the extent of movement of said object into said rack, tong means engageable with said predetermined portion for lacking said object in stored condition, and cam means on said transfer means and said stop and latching device located for simultaneous coaction as the object approaches its stored position thereby effecting release of said transfer means from said object when the latter has completed its movement and is latched in its stored position.

17. In a missile ramming system, a rammer having a rammer head, a discontinuous rail having spaced apart aligned rail portions, said rail having a group of slots and grooves cooperable with protrusions on said missile for supporting said missile thereon while said missile is being rammed, a plurality of floating rail sections positioned between said spaced apart portions, said floating rail sections having surfaces defining slots and grooves corresponding with those on said rail portions, and vertical recesses extending downwardly from the aft end of the slots and grooves of the floating rail sections and intersecting the lower surface thereof for receiving said missile protrusions as the missile in hoisted upwardly, said rammer head being engageable with said protrusions for moving said protrusions along the slots and grooves of the floating sections and subsequently into engagement with the slots and grooves of the rail portions, and releasable latch means cooperating with said floating rail sections and said protrusions to lock said protrusions in predetermined position on said floating rail sections prior to further movement onto the rail portions.

18. In a rammer, a rammer housing, a rail for supporting an object being rammed, a rammer head in said housing engageable with predetermined protrusions on said object for ramming said object along said rail, a rammer chain attached to said rammer and movable along said rail from a retracted position to an extended position for applying ramming power to said rammer head, a swinging track section having upwardly extending roller guide surfaces pivotally attached to said housing and swingable about a horizontal axis from a first position disengaged from said rail to a second position engaged with said rail and rollers on said rammer head receivable on said roller guide surfaces when the latter are in said second position whereby said rammer head is moved out of engagement with said protrusions when said chain is in retracted position and said rollers have been moved up with said guide surfaces.

References Cited by the Examiner

UNITED STATES PATENTS

| | | | |
|---|---|---|---|
| 1,556,294 | 10/1925 | Meehan | 214—38.24 X |
| 1,841,454 | 1/1932 | Robertson | 102—98 |
| 2,051,062 | 8/1936 | Turner et al. | 214—16.16 X |
| 2,201,154 | 5/1940 | Bruce | 214—16.42 X |
| 2,383,051 | 8/1945 | Everard | 104—98 |
| 2,442,549 | 6/1948 | Pearlman | 104—131 |
| 2,549,239 | 4/1951 | Robertson | 214—16.4 X |
| 2,831,400 | 4/1958 | Hosli | 89—1.7 |
| 2,985,072 | 5/1961 | Carlberg et al. | 89—1.7 |
| 3,048,087 | 8/1962 | Campbell | 89—1.7 |

BENJAMIN A. BORCHELT, *Primary Examiner.*

SAMUEL FEINBERG, SAMUEL BOYD, *Examiners.*

SAMUEL W. ENGLE, *Assistant Examiner.*